US009725242B2

(12) United States Patent
Issing et al.

(10) Patent No.: US 9,725,242 B2
(45) Date of Patent: Aug. 8, 2017

(54) SYSTEM AND METHOD FOR THE JOINT PICKING OF BREAKABLE AND UNBREAKABLE ARTICLES

(71) Applicant: SSI Schaefer Noell GmbH Lager- und Systemtechnik, Giebelstadt (DE)

(72) Inventors: Elmar Issing, Giebelstadt (DE); Christian Herzmaier, Wurzburg (DE)

(73) Assignee: SSI Schäfer Noell GmbH Lager-und Systemtechnik, Giebelstadt (DE)

( * ) Notice: Subject to any disclaimer, the term of this patent is extended or adjusted under 35 U.S.C. 154(b) by 0 days.

(21) Appl. No.: 15/068,907

(22) Filed: Mar. 14, 2016

(65) Prior Publication Data

US 2016/0194153 A1 Jul. 7, 2016

Related U.S. Application Data

(63) Continuation of application No. PCT/EP2014/069435, filed on Sep. 11, 2014.

(30) Foreign Application Priority Data

Sep. 13, 2013 (DE) .......................... 10 2013 015 456
Sep. 11, 2014 (WO) ................. PCT/EP2014/069435

(51) Int. Cl.
*G06Q 10/08* (2012.01)
*B65G 1/137* (2006.01)

(52) U.S. Cl.
CPC ........... *B65G 1/1378* (2013.01); *B65G 1/137* (2013.01); *G06Q 10/087* (2013.01); *G06Q 10/0832* (2013.01)

(58) Field of Classification Search
CPC .......................... B65G 1/1378; G06Q 10/0832
See application file for complete search history.

(56) References Cited

U.S. PATENT DOCUMENTS 3,670,867 A * 6/1972 Traube ................. B65G 1/1378
186/57
6,721,762 B1 * 4/2004 Levine ................... G06Q 10/04
(Continued)

FOREIGN PATENT DOCUMENTS

DE 10 2010 060 864 A1 5/2012
DE 20 2012 100 535 U1 8/2012
WO WO 2012085271 * 6/2012 ............. B65G 1/137

OTHER PUBLICATIONS

International Search Report for corresponding Application No. PCT/EP2014/069435 dated Jan. 19, 2015.

*Primary Examiner* — Thomas Randazzo
(74) *Attorney, Agent, or Firm* — Renner, Otto, Boisselle & Sklar, LLP

(57) ABSTRACT

It is disclosed a method for picking, in accordance with the goods-to-man principle, a plurality of different articles in accordance with orders, wherein preferably at least one of the orders comprises both fragile and non-fragile articles, which are to be packed together into a shipping container, in a storage and order-picking system, wherein the storage and order-picking system comprises: a warehouse where the articles are stored as storage units, each respectively containing articles of one type only; a plurality of picking-and-packing stations, wherein each picking-and-packing station comprises at least one collecting zone and is configured to buffer a plurality of the articles and to provide the shipping container; a conveying system connecting the warehouse to the picking-and-packing stations; and a controlling unit configured to assign the orders to the picking-and-packing stations, to monitor the picking, and to control material flow; wherein the method comprises the following steps: collecting a plurality of orders; batch-orientated analyzing the collected orders by the controlling unit; batch-orientated assigning the analyzed orders to the picking-and-packing (Continued)

stations by the controlling unit, wherein each of the analyzed orders is assigned to, preferably one of, the collecting zones; article-orientated conveying the storage units via the conveying system from the warehouse to the picking-and-packing stations; removing, preferably manually, the articles conveyed to the picking-and-packing stations, and order-orientated distributing the removed articles to the corresponding collecting zones by depositing the removed articles in the corresponding collecting zones; and packing the collected articles into the shipping container at the corresponding picking-and-packing stations.

17 Claims, 11 Drawing Sheets

(56) References Cited

U.S. PATENT DOCUMENTS

| | | | | |
|---|---|---|---|---|
| 7,050,938 B1* | 5/2006 | Prater | ................ | G06Q 10/087 702/174 |
| 7,988,406 B2* | 8/2011 | Schafer | ................ | B65G 1/1378 414/286 |
| 7,991,506 B2* | 8/2011 | Schafer | ................ | B65G 1/1378 414/273 |
| 8,073,753 B2* | 12/2011 | Cunniff | ................ | G06Q 10/08 705/35 |
| 8,195,326 B2* | 6/2012 | Schaefer | ................ | B65G 1/137 186/55 |
| 8,666,536 B2* | 3/2014 | Freudelsperger | ........ | B65G 1/08 700/214 |
| 8,671,649 B2* | 3/2014 | Schafer | ................ | B65G 1/1378 53/237 |
| 8,707,658 B2* | 4/2014 | Schafer | ................ | B65G 1/1378 414/267 |
| 8,996,157 B2* | 3/2015 | Collin | ................ | B65G 1/0485 700/213 |
| 9,230,233 B1* | 1/2016 | Sundaresan | ........ | G06Q 10/0832 |
| 9,457,966 B2* | 10/2016 | Issing | ................ | B65G 1/1378 |
| 2004/0200692 A1* | 10/2004 | Tanaka | ................ | B65G 37/02 198/349 |
| 2009/0136328 A1* | 5/2009 | Schafer | ................ | B65G 1/026 414/273 |
| 2009/0288996 A1* | 11/2009 | Shafer | ................ | B65G 1/1378 209/546 |
| 2013/0239524 A1* | 9/2013 | Stoetzner | ................ | B65B 5/00 53/467 |

* cited by examiner

SYSTEM AND METHOD FOR THE JOINT PICKING OF BREAKABLE AND UNBREAKABLE ARTICLES

RELATED APPLICATIONS

This is a continuation application of the co-pending International patent application PCT/EP2014/069435 (WO 2015/036503 A1) filed on Sep. 11, 2014, which claims priority of the German patent application DE 10 2013 015 456.1 filed on Sep. 13, 2013. These applications are fully incorporated herein with reference.

BACKGROUND OF THE INVENTION

The present invention relates to a method for picking according to the goods-to-man principle a plurality of different articles in accordance with orders, wherein preferably at least one of the orders comprises both fragile (i.e. breakable) and non-fragile (i.e. non-breakable) articles which are to be packed together into one shipping container in a storage and order-picking system. The invention further relates to a corresponding storage and order-picking system as well as to a picking-and-packing station.

Related Prior Art

The term "picking" is to be understood as collecting articles from a range of articles and the arrangement of articles to form an order of a customer.

In the field of interlogistics there are substantially two principles according to which articles are picked within a warehouse. The picking process either is performed in accordance with the principle "man-to-goods", or in accordance with the principle "goods-to-man". With the principle "man-to-goods" the picking person, or employee, gathers the articles together from the warehouse, wherein the picking person collects the articles which are stored statically in the warehouse. However, the articles can also be brought from the warehouse to the picking person. Then, one speaks of the "goods-to-man" principle. In this context, systems are used which have a dynamic article provision, wherein the picking persons occupy a spatially-fixed picking station, where they are supplied with articles via a conveying system.

In addition, a plurality of different picking-guidance strategies exist which are designated by expressions such as "Pick-to-Belt", "Pick-by-Light", "Put-to-Light".

The "Pick-by-Light" strategy offers significant advantages in comparison to classic manual picking methods which require the existence of delivery notes or invoices at the time of the picking (article removal and article deposition). With pick-by-light systems a signalling lamp is located at each access location, the signalling lamp comprising a digital display, or even an alphanumerical display, as well as at least one acknowledging button, and possibly input or correction buttons. If an order container, into which the articles are put from, for example, storage containers, arrives at a picking position, then the signalling lamp is lit up at that access location from which the articles, or piece goods, are to be removed. The to-be-removed number appears in the display. The removal is then acknowledged by means of the acknowledging button, and the stock change can be reported back to the warehouse administration system in real time. Pick-by-light systems are often operated in accordance with the "man-to-goods" principle (source: Wikipedia).

Further, receiptless picking by means of "pick-by-voice" is known (source: Wikipedia). In this case communication between a data-processing system and the picking person happens by voice. Instead of printed picking lists or data-radio terminals (i.e. mobile data detection units (MDU), the picking person most times works with a headset (earphone and microphone) which can be connected, for example, to a commercially available pocket PC. The orders are then transmitted from the warehouse-administration system to the picking person by radio, most times by WLAN/WiFi. A first voice output typically includes the rack from which piece goods are to be removed. If the picking person has arrived there, the picking person can name a check digit attached to the rack, which allows the system to perform check of the access location. If the right check digit has been named the picking person gets notified a removal quantity in terms of a second voice output. If the rack comprises several access locations the picking person, of course, gets notified on the concrete access location also in terms of a voice output. After removal of the to-be-picked piece good(s) the picking person acknowledges this process by key words which are recognized by the data-processing device by means of voice recognition.

Further, with picking it is distinguished, due to the selected strategy, between order-related and article-related picking, wherein the collection of the articles as such can either occur serially, i.e. in succession, or in parallel, i.e. at the same time. With the order-related picking one order is processed as a whole, i.e. each article of the order is collected serially. With the article-related picking, by contrast, each order is processed by one picking person in parallel, who respective gathers together, or search, only a part of the orders.

The manner in which picking is conducted can depend on many factors. One factor, which certainly plays a role, is the average order structure. There is a difference in whether different articles are to be picked in small number of pieces, or if identical articles are to be picked again and again in high number of pieces. In this case, for example, the so-called access frequency of the to-be-picked articles can be relevant.

Another criterion is to be seen in the constitution of the articles (shape, weight, surface, packaging, orientation, etc.). Some articles can be picked easily and in automated manner well (e.g., pharmaceuticals in rectangular packages), and others cannot (e.g., cylindrical cans).

Further, it is relevant whether the articles are fragile or non-fragile. Fragile articles are difficult to handle in an automated manner. Fragile articles cannot be shipped together with non-fragile articles without filling material, since the danger of breaks exists. Fragile articles, for example, cannot be distributed via sorter systems to target locations serving as manual packing stations.

There are articles which are oversized in comparison to the remaining range of articles, and therefore cannot be transported through a conventional conveying system from the warehouse to the picking stations. Further there are articles which can be transported, for example, in a lying manner only such as it is often the case in the field of fashion (flat-packed goods).

In particular the handling of orders is difficult which comprise both fragile and non-fragile articles. For protecting the fragile articles additional filling materials are frequently used such as air cushions, chips, or the like. Filling materials and upholstery materials are used for filling up voids in (shipping) cartons for packing and fixing shock-sensitive packing goods in a shockproof and breakproof manner. This is not environment-friendly, and besides that expensive if the shipping costs depend on volume.

It gets even more difficult if a lot of the above-mentioned factors need to be considered at the same time when an appropriate picking method has to be selected. One example of such difficult conditions is exemplarily represented by a distribution center of a homeware dealer. A homeware dealer deals, amongst other things, with crockery, furnitures, and all other types of equipment by which a house or an apartment can be furnished. Typical homeware products are: glasses, cutlery, storage compartments, pots, pans, vases, illuminants, candles, candlesticks, window shades, stools, adapters, pincers, kitchen roll supports, time switches, LED lamps, cages, hooks, sliders, bottles, openers, outlet strips, ice-cube trays, hangers, crewcuts, funnels, graters, milk frothers, scissors, paint brushes, mattresses, duckboards, pillows, blankets, upholstery, head pillows, curtains, bags, bedlinen, towels, bathrobes, carpets, toys, decoration objects and the like. Based on these exemplarily mentioned products it is easy to understand that at the time of packing the articles of one order it is extremely important that the articles of the order are packed into the shipping container (e.g., carton) so that the fragile articles will not be damaged during the transportation to the customer, i.e. are packed in a breakproof manner. The plurality of fragile articles points against the usage of endlessly circulating horizontal sorters for the picking process, which horizontal sorters are typically loaded manually with single articles at some few feeding points. Typically, the sorters comprise endless circulating trays into which respectively one single article is put which is then pushed later in an automated manner to the target location. The target locations are often provided as chutes, laterally adjacent to the sorter, in an end region of which different articles are collected for being subsequently packed (cf. also FIG. 11). In order to ensure a sufficient high picking performance (picks/hour) the sorters must circulate at a relatively high velocity. The higher the circulation velocity of the sorter is, the higher the velocity of the to-be-discharged conveying good is at the respective target location. If the sorter is operated at an overvelocity the conveying goods are destroyed or damaged in the target locations when discharged. Packagings, for example, can be scratched which is particularly disadvantage for expensive goods (e.g., perfume bottles). However, if the conveying velocity of the sorter is reduced more sorters have to be used for achieving the desired performance. This in turn increases the investment costs and the need for space. In addition, it might be that in this case the same article needs to be put onto several sorters so that a downstream (order) consolidation is required. All this is disadvantageous.

The number of target locations is limited by the length of the sorter, but also by the facility (because big radiuses are required). Many times the target locations are provided with switched subdivisions for the purpose of providing more target locations in narrow spaces. The subdivisions in turn need to be controlled exactly, whereby the risk of break is once again increased with vertical embodiments. Most times sorters are huge, bulky, and cannot be passed unhindered. Dependent on the performance (velocity) the width of target locations is difficult to determine/to select (parabola). However, in principle, it is always difficult to reduce the size of the target location, the inclination angle, the surface consistence (material, roughness, graining) of the chute and thereby the risk of collisions and break. The feeding of the articles (separation), as a rule, is performed manually, however in most cases a direct or indirect feeding onto the sorter can be selected (inductions). Direct feeding locations obstruct each other (tray assignment and occupation) and the feeding performance decreases very rapidly. With closed target locations (most times temporary) and with reading and assignment errors the articles circulate and occupy the trays. The sorter performance is again reduced. By providing several feeding locations the articles arrive at the target locations in a mess. For obtaining a sufficient sorting quality each of the articles should be provided with a well-readable bar code which in turn should always be pointing to the top side in a well readable manner on the sorter. Thus expensive reading devices are required.

SUMMARY OF THE INVENTION

Therefore, it is an object of the present invention to provide a storage and order-picking system, a picking station as well as a method for picking, preferably both fragile and non-fragile, articles and to optimize a filling degree of shipping containers.

In accordance with a first aspect a method for picking, in accordance with the goods-to-man principle, a plurality of different articles in accordance with orders is proposed, wherein preferably at least one of the orders comprises both fragile and non-fragile articles, which are to be packed together into a shipping container in a breakproof manner, in a storage and order-picking system, wherein the storage and order-picking system comprises: a warehouse in which the articles are stored as storage units, each by one type only; a plurality of picking-and-packing stations, wherein each picking-and-packing station respectively comprises a collecting zone and is configured to buffer a plurality of the articles as well as to provide the shipping container; a conveying system connecting the warehouse to the picking-and-packing stations; and a controlling unit being configured to assign the orders to the picking-and-packing stations, to monitor the picking process, and to control material flow; wherein the method comprises the following steps: collecting a plurality of orders; batch-orientated analyzing the collected orders by the controlling unit; batch-orientated assigning the analyzed orders to the picking-and-packing stations by the controlling unit, wherein each of the analyzed orders preferably has assigned one of the collecting zones; article-orientated conveying the storage units via the conveying system from the warehouse to the picking-and-packing stations; removing, preferably manually, the articles conveyed to the picking-and-packing stations, and order-orientated distributing the removed articles to the corresponding collecting zones by depositing the removed articles into the corresponding collecting zones; and packing the collected articles into the shipping containers at the corresponding picking-and-packing stations.

In accordance with another aspect of the invention a method for picking, in accordance with the goods-to-man principle, a plurality of different articles in accordance with orders is proposed, wherein preferably at least one of the orders comprises both fragile and non-fragile articles, which are to be packed together into a shipping container in a breakproof manner, in a storage and order-picking system, wherein the storage and order-picking system comprises: a warehouse in which the articles are stored as storage units, each by one type only; at least one picking-and-packing station which comprises a plurality of collecting zones and is configured to buffer a plurality of the articles as well as to provide the shipping container; a conveying system connecting the warehouse to the picking-and-packing stations; and a controlling unit configured to assign the orders to the picking-and-packing stations, to monitor the picking process, and to control material flow; wherein the method comprises the following steps: collecting a plurality of orders; batch-orientated analyzing the collected orders by the controlling unit; batch-orientated assigning the analyzed orders to the picking-and-packing stations by the controlling unit, wherein each of the analyzed orders has assigned preferably one of the collecting zones; article-orientated conveying the storage units via the conveying system from the warehouse to the picking-and-packing stations; removing, preferably manually, the articles conveyed to the picking-and-packing stations, and order-orientated distributing the removed articles to the corresponding collecting zones by depositing the removed articles into the corresponding collecting zones; and packing the collected articles into the shipping containers at the corresponding picking-and-packing stations.

In accordance with still another aspect of the invention it is disclosed a method for picking, according to the goods-to-man principle, a plurality of different articles in accordance with orders, wherein at least one of the orders comprises both fragile and non-fragile articles, which are to be packed together into one shipping container in a break-proof manner, in a storage and order-picking system, wherein the storage and order-picking system comprises: a warehouse in which at least some of the articles are stored in terms of storage units, each of the storage units containing articles of one article type only; at least one picking-and-packing station comprising a plurality of collecting zones being configured to buffer a plurality of the articles and being configured to provide one or more shipping containers; a conveying system connecting the warehouse to the at least one picking-and-packing station; and a controlling unit configured to assign the at least one of the orders to the at least one picking-and-packing station, to monitor the picking, and to control article flow, wherein the method comprises the steps of: collecting a plurality of the orders which includes the at least one of the orders; batch-orientated analyzing the collected orders by the controlling unit; batch-orientated assigning the analyzed orders to the at least one picking-and-packing station by the controlling unit), wherein each of the analyzed orders is assigned to the collecting zones; article-orientated conveying the storage units via the conveying system from the warehouse to the at least one picking-and-packing station; removing the articles conveyed to the at least one picking-and-packing station, and order-orientated distributing the removed articles to the corresponding collecting zones by depositing the removed articles into the corresponding collecting zones; and packing the collected articles into the one or more shipping containers at the at least one picking-and-packing station.

The present invention allows the common picking of fragile (soft) and non-fragile (solid) diffuse goods, in particular without filling material. The filling degree is optimized. The shipping containers can be packed with significantly more articles (filling degree almost 100%). The picking process is performed without the utilization of sorters because the sorters cannot transport the fragile goods. The fragile goods in this sense are not enabled for sorters. The non-fragile goods are enabled for sorters. The non-sorter enabled goods would be damaged or destroyed during the transportation on the sorter because the transportation velocities would need to be set too high for achieving the desired picking performance achieved by the present invention. At the latest during discharging of the non-sorter enabled goods the non-sorter enabled goods would be damaged or destroyed because the goods would bump onto guiding walls or discharging devices at discharging points at high velocity. The present invention completely omits to use sorters. In this manner high investment costs as well as space can be saved, which is typically required for setting up a sorter. With the present invention an optimized utilization of space can be achieved. The conveying system does not need to be routed through the system in terms of meanders.

The picking-and-packing stations can be spatially distributed arbitrarily within a system. Since the circulating sorters are omitted conventional conveying systems can be used for supplying the picking-and-packing stations with the articles, which are to be picked.

However, the invention does not only allow the handling of fragile goods but also of oversized goods and goods which cannot be handled by machines.

In addition, in comparison to the conventional sorter solutions, the present invention can perform a so-called "bundle pick". If one order requires a plurality of articles of the same article type, the sorter solution requires deposition of respectively one single article into many of the circulating trays of the sorter. Several articles cannot be deposited in the same tray of the sorter at the same time because the articles, which are fed to the sorter in a batch-orientated manner, need to be distributed lateral to a plurality of target locations. In addition, the sorter circulates endlessly at a relatively high velocity so that it is hardly possible to deposit several articles simultaneously into one and the same tray of the sorter. Further, there is the danger that a plurality of the articles within the same tray of the sorter would damage, or even destroy, each other during the circulation due to the high velocity. Certainly, with the present invention the articles are transported in a batch-orientated manner to the picking-and-packing stations. However, the removal and distribution of the articles is performed in a bundled manner. This means that several articles are removed simultaneously, and several articles are fed simultaneously to one or more target locations (collecting zone) and are deposited there.

In addition, it is possible to deposit an entire storage unit, which can contain a plurality of the required articles, in one single step on the target location (collecting zone). With the conventional sorter solution each of the articles of the storage unit would need to be separated in a first step, and subsequently transported one after the other to the target location for being deposited one-by-one there. Such boundary conditions limit the performance of the conventional sorter, and thereby let the sorter appear inappropriate for the present picking scenario.

Another advantage of the invention is to be seen in that, at an identical picking performance, less staff than with the conventional sorter solutions is required. FIG. 11 shows a conventional sorter solution. FIG. 11 shows a top view of a part of an order-picking system 1100 having a picking warehouse 1102, which is connected via a conveying system 1104 to an endlessly circulating sorter 1106 which comprises a plurality of sorter trays 1108. The sorter 1106 is filled with articles by employees 1110 at a first longitudinal side by putting respectively one article into one sorter tray 1108. In FIG. 11 six employees 1110 are shown in total for filling the sorter 1106. At the opposite longitudinal side of the sorter 1106 twelve employees 1112 are shown who remove the articles from a target-location region 1114 and put the articles into cartons (not shown). The target-location region 1114 comprises a plurality of target locations which are not depicted in more detail here. The cartons are stacked onto order pallets 1116 after a completed packing process.

With the conventional sorter solutions, which are basically structures like the system of FIG. 11, the employees 1110 cannot easily change onto the side of the employees

1112, if required, for assisting the employees 1112. The same, of course, applies in the reverse direction. With the present invention the picking persons and the packing persons, however, can arbitrarily change their positions. Further, it is possible that a picking person fulfills both the tasks of a picking person and the tasks of a packing person. The same applies for the packing person.

With a particular embodiment each of the orders comprises at least one order line, and in case of order lines, which include several articles of the same article type, the removal is performed in a bundled manner.

In particular, the step of packing happens such that the fragile articles of the at least one of the orders is secured by the non-fragile articles of the at least one of the orders against destruction during later transportation.

The packing persons can decide individually on how to pack the fragile and non-fragile articles into the shipping container. The experience of the packing persons is used. During the packing process additional filling material can be omitted. The packing persons pack the shipping container in a volume-optimized manner. Thereby volume-dependent shipping prices can be reduced. The packing persons pack the articles such that the fragile articles are not damaged. The fragile articles are "pad" by the non-fragile articles.

With one embodiment a sufficient quantity of removed articles is collected in the collecting zones for allowing the breakproof packing.

Even during the analysis of an order a sequence can be determined (coarsely), in which sequence the articles of the order are transported towards the assigned collecting zone. In this manner it can be ensured that in a first step not only fragile articles reach the collecting zone, which then cannot be packed in a breakproof manner, but always a suitable mixture of articles arrives at the collecting zone.

Preferably, each of the orders is packed into at least one of the shipping containers, particularly without additional filling material.

Even during the analysis it is determined which article will be present in the shipping container(s). This information is particularly required for cross-border transportation of the shipping containers. Thus, the articles can be tracked from the beginning.

Further, it is preferred that the step of analyzing comprises the following: analyzing each of the orders with regard to an order-specific quantity of articles; determining an order-specific packing volume based on the order-specific quantity of articles; dividing the order-specific quantity of articles into one or more subquantity of articles, preferably dependent on a quotient of the order-specific packing volume and a volume of one shipping container; and assigning each of the subquantities of articles to the corresponding shipping container.

Even during the step of analyzing the articles of one order can be divided such that they fit into the shipping containers in a volume-optimized manner. This optimization is automatically possible since shipping containers exist, which preferably are dimensioned differently. The corresponding data is recorded in the controlling unit, even the volume data of the article. The partitioning of the quantity of articles into subquantity of articles allows packing of the articles into several shipping containers, wherein the contents of the shipping containers can be tracked exactly.

Further, there is an advantage in placing separating markers into the collecting zone in case when the each article of one of the subquantities of articles is deposited in the collecting zone. In this manner collecting regions can be defined which in turn are assigned to individual shipping containers.

The separating markers represent an optical aid for distinguishing articles which need to be packed into different shipping containers of one single order or of different orders. The packing person recognizes automatically that the articles, which are located in the collecting zone, are to be divided onto several shipping containers of one or more orders. Further, it is possible, if it is required that articles are transferred—contrary to the original planning (volume calculation)—between shipping containers, to visually illustrate this transfer. The packing person can notify the controlling unit, for example, by scanning that he/she transfers articles between different shipping containers by transferring the related articles across the separating marker between different collecting regions. Thus, article tracking is possible, which is required for the export. Feedback to the software for the purpose of volume calculation can be given, in order to continuously improve the planning.

With another embodiment the step of packing includes: packing the articles from one of the collecting regions into the assigned shipping container; checking whether the assigned shipping container can receive each of the articles from the one of the collecting regions; if the assigned shipping container cannot receive each of the articles from the one of the collecting regions, depositing of surplus articles into a subsequent collecting region and informing the controlling unit on the deposited surplus articles; or, if the assigned shipping container can receive even more than the articles from the one of the collecting regions, removing additional articles from a subsequent collecting region, packing the additional articles into the assigned shipping container until the assigned shipping container is completely packed, and informing the controlling unit on the removal of the additional articles.

This measure results in a volume-optimized packing of the shipping containers, wherein the contents are trackable and are selectable, or determinable, freely by the packing person in that the packing person decides on her/his own which (critical) article is to be packed in which one of the shipping containers.

The packing person can stack the completely packed shipping containers, particularly in an order-orientated manner, onto order-load supports such as pallets. Alternatively, the shipping containers can also be given to a conveyor which transports the shipping containers, for example, into a palletizing or shipping region.

According to still another aspect of the invention it is proposed a picking-and-packing station in a storage and order-picking system for picking a plurality of different articles in accordance with orders, wherein at least one of the orders comprises both fragile articles and non-fragile article, which are to be packed together manually into at least one shipping container in a breakproof manner, wherein the shipping container is to be packed preferably onto an order-load support, wherein the picking-and-packing station comprises: a plurality of collecting zones, which are arranged preferably side-by-side and which are separated from each other physically by barriers, wherein each of the collecting zones is loaded from a first side for buffering the articles and is unloaded from a second opposite side for packing the at least one shipping container; a feeding device for empty shipping containers; a provision location for the order-load support; a feeding device for storage units containing the to-be-picked articles; a discharging device for the storage units; and a picking-guidance system.

According to still another aspect it is disclosed a picking-and-packing station in a storage and order-picking system for picking, in accordance with the goods-to-man principle, a plurality of different articles in accordance with orders, wherein at least one of the orders comprises both fragile articles and non-fragile articles, which are to be packed manually together in a breakproof manner into at least one shipping container, wherein the picking-and-packing station comprises: a plurality of collecting zones, wherein each of the collecting zones is configured to be loaded from a first side for buffering the articles and to be unloaded from a second opposite side for packing the at least one shipping container; a feeding device for providing empty shipping containers at the collecting zones; a provision location for order-load supports; a feeding device for providing storage units containing the to-be-picked articles at the collecting zone; a discharging device for removing the storage units from the collecting zones; and a picking-guidance system.

According to still another aspect of the invention it is disclosed a storage and order-picking system having at least one picking-and-packing station which comprises: a plurality of collecting zones, wherein each of the collecting zones is configured to be loaded from a first side for buffering the articles and to be unloaded from a second opposite side for packing the at least one shipping container; a feeding device for providing empty shipping containers at the collecting zones; a provision location for order-load supports; a feeding device for providing storage units containing the to-be-picked articles at the collecting zone; a discharging device for removing the storage units from the collecting zones; and a picking-guidance system; wherein the storage an order-picking system further comprises: a warehouse where storage units, each of which contains articles of one article type only, are stored; a conveying system; and a controlling unit configured to perform the step of: batch-orientated analyzing the orders; and batch-orientated assigning the analyzed orders to the picking-and-packing station, wherein each of the analyzed orders is assigned to the collecting zones.

Further, it is preferred if the system comprises at least one of the following components: a goods receipt, a long-term warehouse, a high-bay warehouse, a block warehouse, a separating station, a depalletizing device, a short-term warehouse, a distributing system, a picking region, a stacker truck, a rack, a gravity track, and a goods issue.

It is clear that the above-mentioned and hereinafter still to be explained features cannot be used only in the respectively given combination but also in other combinations or alone without departing from the scope of the present invention.

BRIEF DESCRIPTION OF THE DRAWINGS

Embodiments of the invention are depicted in the drawings and will be explained in more detail in the following description, wherein.

PREFERRED EMBODIMENTS OF THE INVENTION

An "article" is to be understood in the following as a handling unit (store keeping unit, SKU) which includes a certain number, which can also be one piece only, of identical articles, wherein these identical articles are coupled to each other (packaging unit) and represent a minimum delivery quantity for this article. Coupling of the number of identical articles, which form one handling unit, i.e. articles of the same type, can be achieved, for example, by a common plastic envelope. Thus, an "article" is to be understood as a specific product in a special packaging size.

A "storage unit" is to be understood hereinafter as a certain number, which can also be only one single piece, of identical articles which are stored "respectively by one type only". The expression "respectively by one type only" means that the storage unit exclusively comprises articles of one single type. Of course, storage units such as compartment-divided containers can be formed in a geometrically divided manner for storing simultaneously also a plurality of articles respectively by one type only.

The picking has the goal to collect subquantities from an entire quantity of goods (range of goods) due to inquiries (orders). One order consists of one or more order positions which are also called order lines. One order line indicates a quantity of an article type respectively desired.

A "batch" is a collection of several orders forming one processing unit. Thus, a "batch" is a collection of several orders forming a sequenced quantity, or list, of orders. In batch operation orders are at first collected and sorted for being processed subsequently in one step, i.e. in a "batch". The present invention is particularly used in the field of retail over the Internet (B2B, B2C, etc.).

Coordination of the processing of orders is taken over by an order-processing system, most times being integrated into an order-picking control which can also comprise an enterprise resource planning system. The order-picking control can further have integrated a (warehouse) location administration as well as an information display. The order-picking control is typically realized by a data processing system which is operated for data transmission and data processing preferably in online operation without delays.

Figure 1:
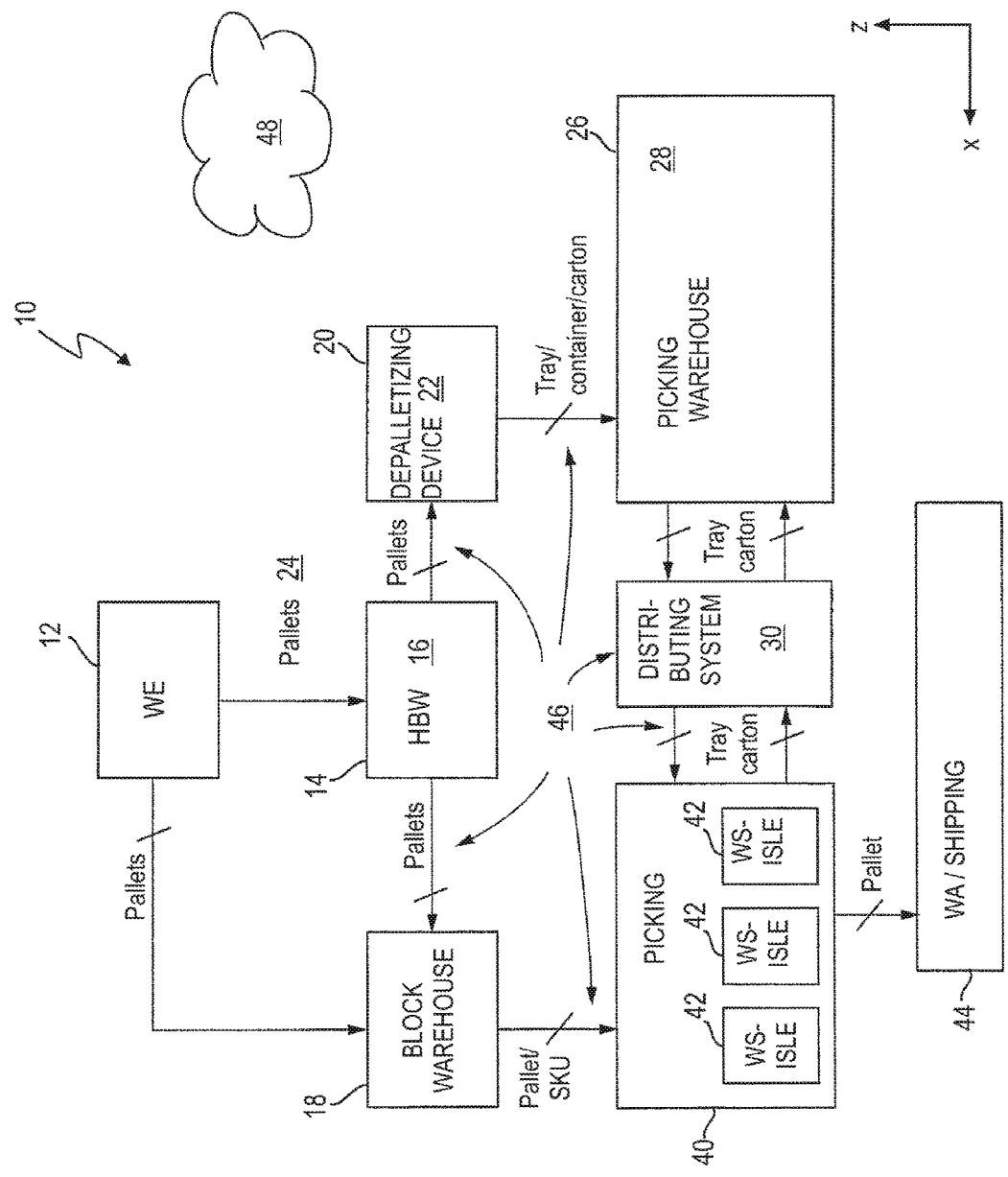
FIG. 1 shows a block diagram of material flow.

FIG. 1 shows a block diagram including material flow of a storage and order-picking system 10 of the present invention, which is used in particular by homeware retailers.

Articles, which are to be picked, are exemplarily supplied to the goods receipt (WE) 12 on pallets 24. From there the articles can be brought into a (long-term) warehouse 14 which is exemplarily formed in the present case as a high-bay warehouse (HBW) 16. Pallets, preferably holding articles of one type only, can be brought from the HBW 16 to one or more separating stations 20 such as a depalletizing device 22. The pallets 24 can be brought from the HBW 16, but also directly from the WE 12, into a block warehouse 18. In the block warehouse 18 the pallets are provided individually in the area, one beside the other.

The depalletizing device 22 separates the pallets 24 into a plurality of storage units 90, which are not shown in more detail here and brought with or without load supports (tray 86, containers, carton, etc.; cf. also FIG. 3), for being buffered in a (short-term) warehouse 26 which is represented in the present case by a picking warehouse 28. From the picking warehouse 28 the buffered storage units 90 are brought via a distributing system 30 into at least one picking region 40 where one or more work-station islands (WS island) 42 are arranged. Individual pallets 24 and/or individual, preferably oversized, articles can be fed to the picking region 40 from the block warehouse 18. The picking process (removal and deposition) happens manually in the picking region 40. Each of the WS islands 42 can comprise one or more picking-and-packing stations 100, which will be described in more detail with reference to FIG. 3. Order-load supports such as pallets 108 are loaded with the to-be-picked articles 104 at the WS islands 42. The articles 104 are packed into shipping containers 106, which are not shown detail here, and then stacked onto the order pallets 108.

In FIG. 1 the order pallets 108 are brought from the picking region 40 into a goods issue (WA), or a shipping region 44. From there the order pallets 108 are transported to the customers.

Within the system 10 of FIG. 1 the articles 104 (cf. also FIG. 4) are transported between the different system components 12, 14, 18, 20, 26, 40 and 44 by means of a conveying system 46. The conveying system 46 can comprise many different components (roller conveyor, chain conveyor, belt conveyor, overhead conveyor, shuttles, etc.). The distributing system 30 can be part of the conveying system 46. Material flow is controlled by a superordinated controlling unit 48 which is formed centrally or in a decentralized distributed manner. The controlling unit 48 is connected to the individual components of the system 10 wirelessly or wired for the purpose of communication. The controlling unit 48 is configured to monitor picking processes. In addition, the controlling unit 48 can take over further tasks such as the order processing, the storage-location administration, implementation of picking-guidance strategies and the like.

Figure 2:
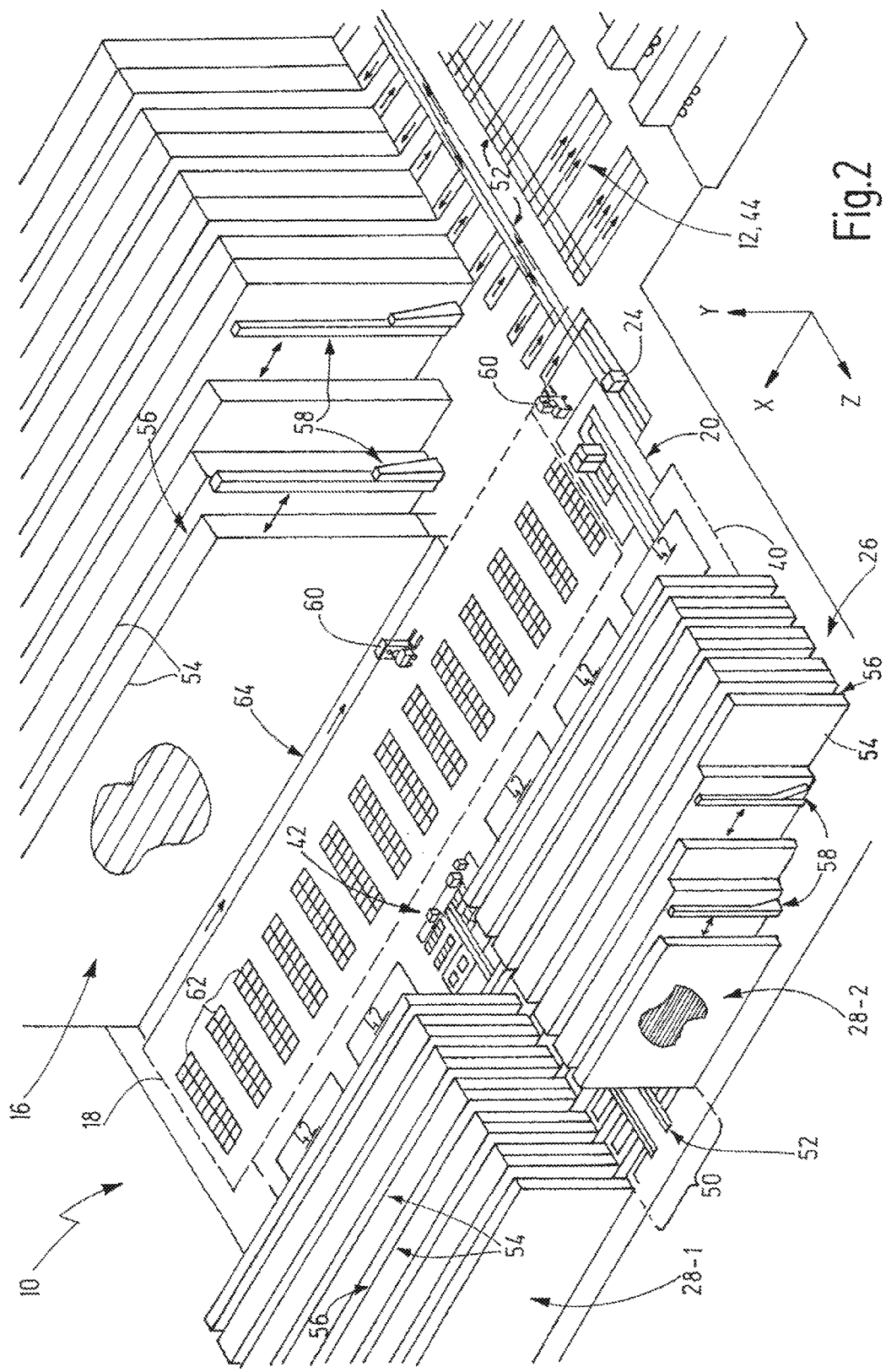
FIG. 2 shows a perspective partial view of a storage and order-picking system of the invention.

FIG. 2 shows a perspective partial view of a first embodiment of the system 10. In an upper part of FIG. 2 one HBW 16 is shown for storing pallets 24 holding storage units 90, holding articles of one type only. In the lower part of FIG. 2 there are exemplarily arranged two oppositely arranged picking warehouses 28-1 and 28-2 defining a pre-zone 50 therebetween, in which parts of the conveying system 46 are arranged. Between the warehouses 16 and 26 a block warehouse 18 as well as the picking region 40 are arranged, which are respectively surrounded by a dashed line in FIG. 2. For example, a separating station 20 is arranged between the block warehouse 18 and the picking region 40, wherein the separating station 20 in turn is connected to the warehouses 16 and 26 via conveyors 52 (e.g. chain conveyors, roller conveyors, belt conveyors, in-floor electric conveyor, overhead conveyors, shuttles, driverless transportation systems or the like). The conveyors 52 are part of the conveying system 46. The conveyors 52 can also be arranged in the pre-zone 50. The conveying system 46 connects, amongst other things, the goods receipt 12 to the warehouse 16 as well as the goods issue 44 to the picking region 40.

The warehouses 16 and 26 typically comprise racks 54 defining rack aisles 56 therebetween. In the rack aisles 56 storage and retrieval devices (SRD) 58, which can be moved in height and longitudinally, move for the purpose of storing and retrieving storage goods (pallets 24, storage units 90, etc.). The SRD 58 can be, for example, rail-guided servicing devices with or without a mast. So-called one-plane servicing devices, or shuttles, can be used, particularly within the warehouse 26 which can also be implemented as an automatic small-parts warehouse (ASPW). If shuttles are used, in most cases vertical conveyors, or vertical lifters, are used as well for bridging differences in height. Shuttles and lifters are not shown in FIG. 2.

Further, within the region of the block warehouse 18 and within the picking region 40 floor-bound conveying vehicles such as stacker trucks 60 can be used for transporting oversized storage goods and pallets 24 and 108. In FIG. 2 two exemplarily stacker trucks 60 are shown. The stacker trucks 60 can transport entire pallets 24 or individual (oversized) storage goods from pallet-provision locations 62 within the block warehouse 18 to the work-station islands 42 in the picking region 40. The picking region 40 of FIG. 2 exemplarily comprises six work-station islands 42 arranged one next to the other, wherein only the central one is shown in greater detail. The (pallet) provision locations 62 of the block warehouse 18 can be supplied with new pallets 24, for example, by a gravity track 64 which in turn is part of the warehouse 16. These pallets 24 can be transferred, for example, by the stacker trucks 60. The stacker trucks 60 can transport completely picked order pallets 108 from the work-station islands 62 to the conveying system 46 which in turn conveys the order pallets 108 to the WA 44.

Figure 3:
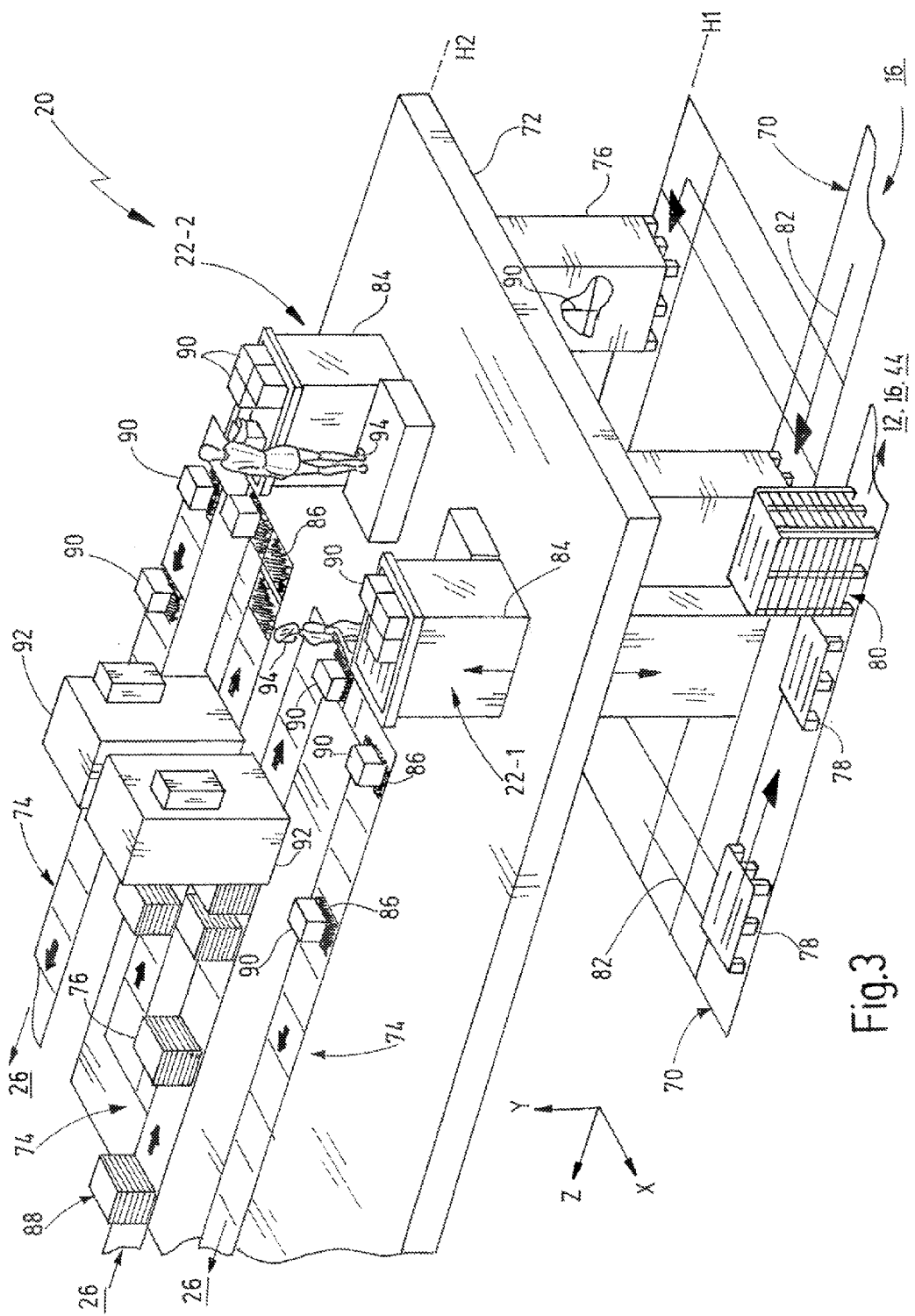
FIG. 3 shows a perspective view of a separating station of FIG. 2.

FIG. 3 shows a perspective partial view of the separating station 20 of FIG. 2.

The separating station 20 is exemplarily arranged at two height levels H1 and H2. At the lower height level H1 (facility ground), for example, a pallet-conveying system 70 is arranged. On the upper height level H2 a platform 72 exemplarily having two (manual) depalletizing devices 22-1 and 22-2 is arranged which are connected to the warehouse 26, for example, via a tray-conveying system 74. Via the pallet-conveying system 70 loaded pallets 76 and empty pallets 78, also in terms of stacks 80 of empty pallets, are conveyed to and from the depalletizing devices 22. Conveying direction 82 is indicated by dark arrows. The full and empty pallets 76 and 78 are transported back and forth via vertical conveyors in shafts 84 between the two height levels H1 and H2. The tray-conveying system 74 conveys trays 86, even in terms of tray stacks 88, to the depalletizing devices 22, and conveys trays 86 being loaded with storage units 90 from the depalletizing devices 22 to the picking warehouse 26. The tray stacks 88 are separated in an automated by means of destacker devices 92. It is clear that the utilization of the pallet-conveying system 70 as well as the tray-conveying system 74 is only of exemplary nature. The storage units 90 can also be transported and stored without load supports, in particular within the warehouse 26. The separation of the storage units 90 can be done manually by employees 94, or in an automated by manner by means of depalletizing robots (not shown).

Figure 4:
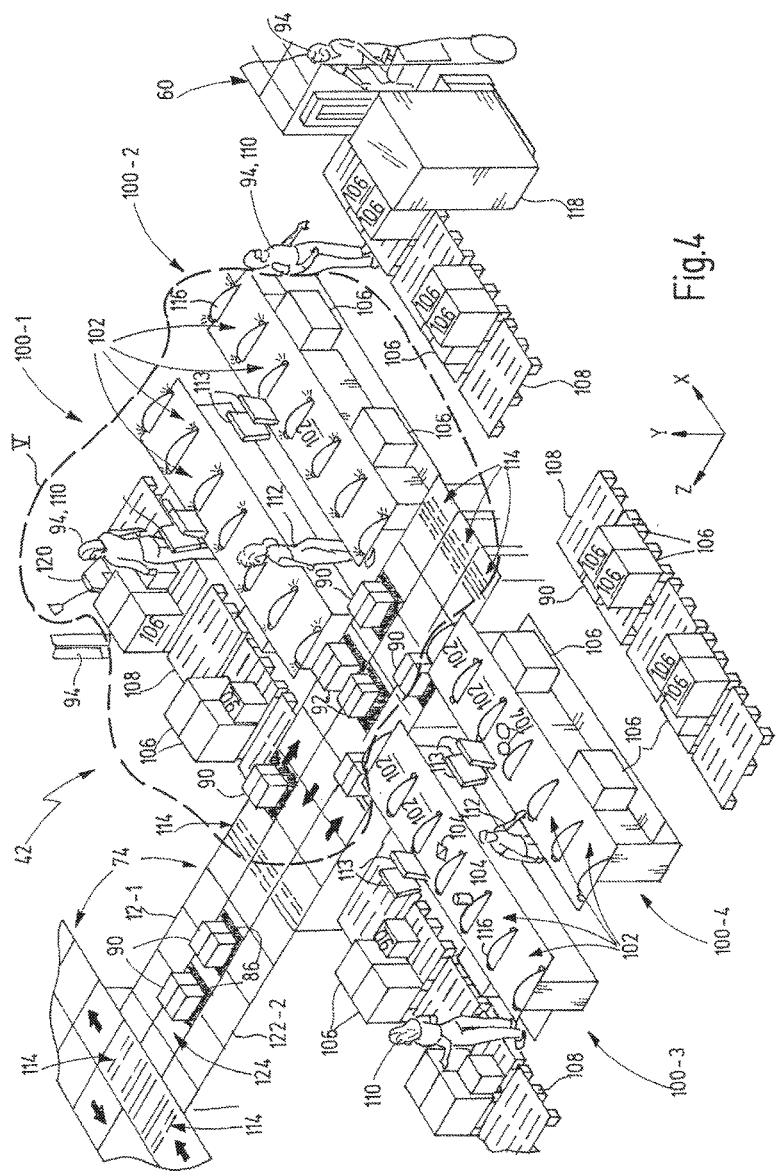
FIG. 4 shows a perspective view of a work-station island of FIG. 2.

FIG. 4 shows a perspective partial view of the central work-station island 42 of FIG. 2.

The work-station island 42 comprises at least one picking-and-packing station (PPS) 100. In FIG. 4, for example, four PPS 100-1 to 100-4 are shown. Each of the PPS 100 comprises at least one collecting zone 102. The PPS 100 of FIG. 4 comprise respectively six collecting zones 102 which are separated from each other. The articles 104 are manually deposited in an order-orientated manner in the collecting zones 102. As soon as sufficient articles 104 have been deposited in the respective collecting zone 102, in order to be packed breakproof, the articles 104 are packed into a shipping container 106 (e.g., carton), which can be stored at the collecting zone 102 and which can be assigned to the picking order to which the corresponding collecting zone 102 is assigned as well. Packed shipping containers 106 can be stacked, for example, on an order pallet 108 being arranged in direct vicinity to the PPS 100 or to the collecting zone 102. The order pallet 108 in turn is then assigned to the corresponding order.

The PPS 100 are typically operated by two employees 94, namely one packing person 110 and one picking person 112. The picking person 112 removes the articles 104, preferably in terms of bundle picks, from the storage units 90 and puts the articles 104 in an order-orientated manner into the collecting zones 102. In this context known picking-guidance strategies can be used such as a put-to-light system as will be explained hereinafter in more detail with reference to FIG. 5. The picking person 112 gets optically signaled a number (quantity) of to-be-removed articles 104 as well as a target-collecting zone 102 where the picking person 112 has to deposit the removed articles 104. It is clear that this process is preferably performed in a batch-orientated manner. The flow of goods is scheduled in advance by the controlling unit 48 so that the picking person 112 at the work-station island 42 can remove and order-orientated distribute as many as possible articles 104 from the storage container 90 and to the collecting zones 102, respectively. The number of to-be-removed articles 104 can be indicated, for example, by a display 113 (e.g., screen, digital display, etc.) being arranged in the region of the PPS 100 or within each of the collecting zones 102.

The packing person 110 is responsible for packing the articles 104 from the collecting zones 102 into the shipping containers 106. The packing process is performed manually. The packing person 110 removes the articles 104 from the collecting zones 102 and then puts them into the shipping containers 106 such that fragile articles 104 are not damaged during a later transportation to the customer. An absolute (spatial) loading configuration is thus not predetermined by the controlling unit 48, but only a volume-specific and/or quantity-specific configuration. The packing person 110 individually, and dependent on the situation, decides how the articles 104 are to be packed from the collecting zone 102 into the assigned shipping containers 106.

The PPS 100-1 and 100-2 are preferably arranged such that they extend in parallel to each other, wherein the picking person 112 can move between the PPS 100-1 and 100-2. The PPS 100-1 and 100-2 are orientated, in particular, perpendicular to the tray-conveying system 74 which transports the storage units 90 with or without trays 86 to the picking person 112 and transports the same from the picking person 112 back again towards the warehouse 26 (cf. FIG. 2) or to another PPS 100. In FIG. 4, for example, three tracks 122 and 124 are shown being arranged in the direct region of the PPS 100. The two outer tracks are feeding tracks 122 and are arranged directly adjacent to the PPS 100. The central track, or line, 124 is a central discharging track 124 by which opened storage units 90 can be transported back into the warehouse 26 or to the other PPS 100. Also, empty trays 86 can be transported back via the central discharging track 124 to the warehouse 26 or to the depalletizing device 22. It is clear that the warehouse 26 in this case is a tray warehouse. If the storage goods 90 are moved without load supports within the system 10, the warehouse 26 could be, for example, a shelving having ribbed shelves. Between the individual tracks, or lines, 122 and 124 of the tray-conveying system 74 transferring devices 114 (e.g. belt lifters or the like) can be further provided for transferring the storage units 90 and/or the trays 86 between the different tracks 122 and 124.

Typically the packing persons 110 work oppositely to the picking persons 112 along the outer sides 134 (cf. also FIG. 5) of the PPS 100. In FIG. 4 the PPS 100 are formed as tables 137 having flat surfaces being orientated horizontally. The collecting zones 102 are physically separated from each other in the longitudinal direction of the tables by vertical barriers 116 extending in the transversal direction of the table 137. Illumination devices can be provided at the barriers 116 which implement a put-to-light system and which will be explained in more detail with reference to FIG. 5.

It is clear that each of the PPS 100 can be operated by at least one employee 94 which takes over both the task of the packing person 110 and the task of the picking person 112. The PPS 100-1 and 100-2 are respectively operated by one packing person 110, wherein one single picking person 112 is used for both the PPS 100-1 and 100-2. Both of the PPS 100-3 and 100-4 are operated by one single picking person 112. The PPS 100-3 is additionally operated by a packing person 110. The packing processes at the PPS 100-4, however, are performed by the same person, namely the picking person 112 who walks around the table 137 for this purpose in order to get to the opposite side where the packing processes occur.

If one order includes higher number of pieces, for example, entire storage units 90 then the storage units 90 can be packed directly from the track 122 onto the order pallet 108 by the picking person 112 and/or the packing person 110. Separation of the storage units 90 into individual articles 104 and buffering into the collecting zones 102 is not needed in this case. Similar is true for oversized articles 118 which are deposited directly onto the corresponding order pallets 108 from the block warehouse 18 (cf. FIG. 2) by means of the stacker trucks 60. The stacker trucks 60 can retrieve completely picked order pallets 108 from the PPS 100 and either give them to the conveying system 46 (cf. FIG. 2) or transport them directly to the goods issue 44 (cf. FIGS. 1 and 2). Alternatively, the order pallets 108 can also be transported manually, for example, by means of a lift truck 120.

Figure 5:
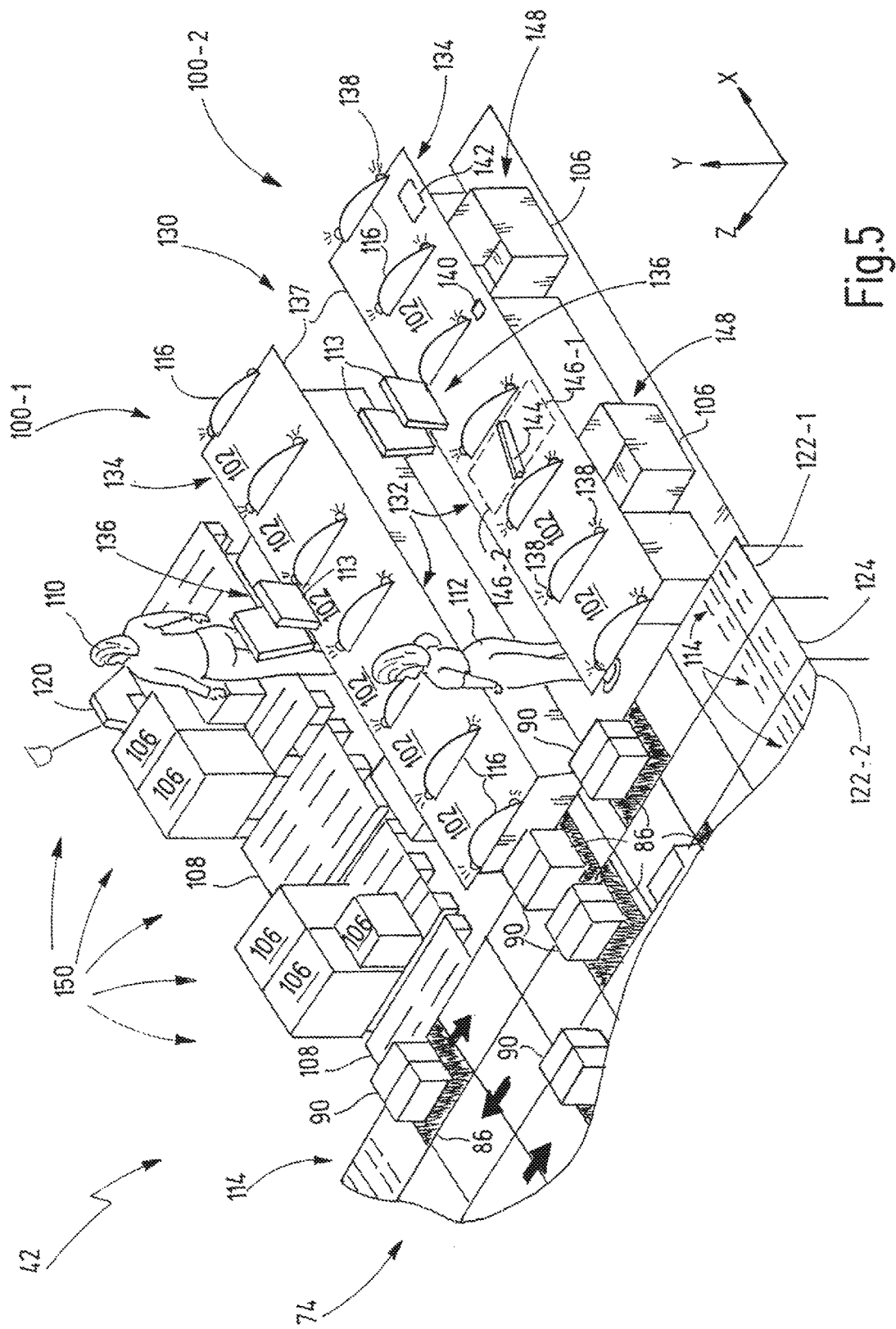
FIG. 5 shows an enlargement of the area V of FIG. 4.

The FIG. 5 shows an enlargement of the region "V" of FIG. 4 surrounded by a dashed line.

In FIG. 5 both of the feeding lines 122-1 and 122-2 as well as the discharging line 124, which is arranged centrally therebetween, for the trays 86 or the storage units 90 are partially shown. The PPS 100-1 and 100-2 are shown in detail. The PPS 100-1 and 100-2 substantially extend along a longitudinal direction X of the system 10. The conveying system 74 substantially extends along a transversal direction Z of the system 10.

Between the PPS 100-1 and 100-2 an aisle 130 extends in which the picking person 112 can move for putting removed articles 104 into the collecting regions 102. The picking person 112 puts the removed articles 104 from a first (longitudinal) side 132 into the collecting zone 102. The packing person 110 removes the deposited and buffered articles 104 from a second oppositely arranged (longitudinal) side 134 for packing the articles 104 into the shipping container 106. The collecting zones 102 are defined, for example, on a top side of a flat table 137. The collecting zones 102 are located, for example, adjacent to each other in the longitudinal direction X. The collecting zones 102 are physically separated from each other by the barriers 116 for preventing a mixing of removed articles 104. The barriers 116 can be formed such that they can be displaced in the longitudinal direction X in an arbitrary manner for varying the width of the collecting zones 102. The lengths of the collecting zones 102 in the transversal direction Y can be selected arbitrarily. Each of the collecting zones 102 has assigned at least one order. Each order has also assigned at least one shipping container 106.

The picking person 112 and the packing person 110, but in particular the packing person 110, are assisted during the removal, disposal and packing processes by a picking-guidance system. In FIG. 5 the picking-guidance system is implemented as a put-to-light system 136. The put-to-light system 136 comprises one or more displays such as the displays 113 for indicating a number of to-be-removed and to-be deposited articles 104 to the picking person 112. Also the deposition location can be indicated. Further, the put-to-light system 136 comprises lamps 138 which are preferably arranged on the barriers 116 for indicating to the picking person 112 into which of the collecting zones 102 the removed articles 104 are to be deposited. One or more (acknowledging) buttons 140 can be provided on both the first side 132 and the second side 134, preferably at each collecting zone 102, for notifying the completion of a partial process (e.g., disposal of one article type in a specific collecting zone 102) to the controlling unit 48 (cf. FIG. 1). In FIG. 5 only one single button 140 is exemplarily shown. The same applies with regard to a scanning device 142 which is indicated by a dashed line. The controlling unit 48 can be notified by the scanning device(s) 142 on the article type being currently handled. This is particularly important in cases when one of the shipping containers 106 either does not contain sufficient articles 104 for being packed in a breakproof manner or too many articles 104 are lying in the collecting zone 102, each of which cannot be packed into the assigned shipping container 106. In this case it can be necessary to pack additional articles 104 into one of the shipping containers 106 which actually do not belong into this shipping container 106, or to pack articles 104, which actually belong into this shipping container 106, into a different shipping container 106.

In FIG. 5 in one of the central collecting zones 102 of the lower PPS 100-2 a (mobile) separating marker 144 is shown which physically and optically separates the collecting zone 102 into two collecting regions 146-1 and 146-2 being separate from each other. The collecting region 146-1 can have assigned a first shipping container 106, whereas the second collecting region 146-2 has assigned a second shipping container 106. The picking person 112, at first, removes the articles 104 dedicated to the first shipping container 106 and then puts them into the collecting zone 102. As soon as the picking person 112 has removed each of the articles 104 and deposited same, the picking person 112 can be notified via the display 113 that the separating marker 144 is to be placed into the corresponding collecting zone 102. Then, the picking person 112 puts the separating marker 144 into the collecting zone 102 and thus divides the collecting zone 102 into a first collecting region 146-1 and a second collecting region 146-2 as indicated in FIG. 5 by a surrounding dashed line. Subsequently the picking person 112 can remove additional articles 104 from the storage units 90 and put them into the second collecting region 146-2. These articles 104 from the second collecting region 146-2 can be packed subsequently by one of the packing persons 110 into a second shipping container 106.

Now, as described above, if too many or too less articles 104 are present in the collecting regions 146, or within the collecting zone 102, the packing person 110 can transfer the articles 104 between the collecting regions 146-1 and 146-2. The corresponding information on the transfer(s) is transmitted by the packing person 110 to the controlling unit 48 by scanning the to-be-transferred articles 104, and preferably only these ones, by means of the scanning device 142.

The shipping containers 106 required for packing the articles 104 are provided at the packing station via a feeding device 148. In FIG. 5 the empty shipping containers 106 are delivered, for example, beneath the table 137. Then the packing person 110 can pack the to-be-packed articles 104 either directly there into the shipping containers 106. Alternatively, the packing person 110 can put the empty shipping container 106 onto the corresponding order pallet 108 which is placed at one of the provision locations 150. The collecting zones 102 are generally flexible with regard to their geometrical size as the shipping containers 106 are. The provision locations 150 are preferably located directly adjacent to the second side 134 of the PPS 100. In particular, as many provision locations 150 as collecting zones 102 are provided. Of course, this relationship can also be changed. In FIG. 5 only five provision locations 150 are provided for six collecting zones 102 since each order pallet 108 can have assigned one or more collecting zones 102.

Figure 6:
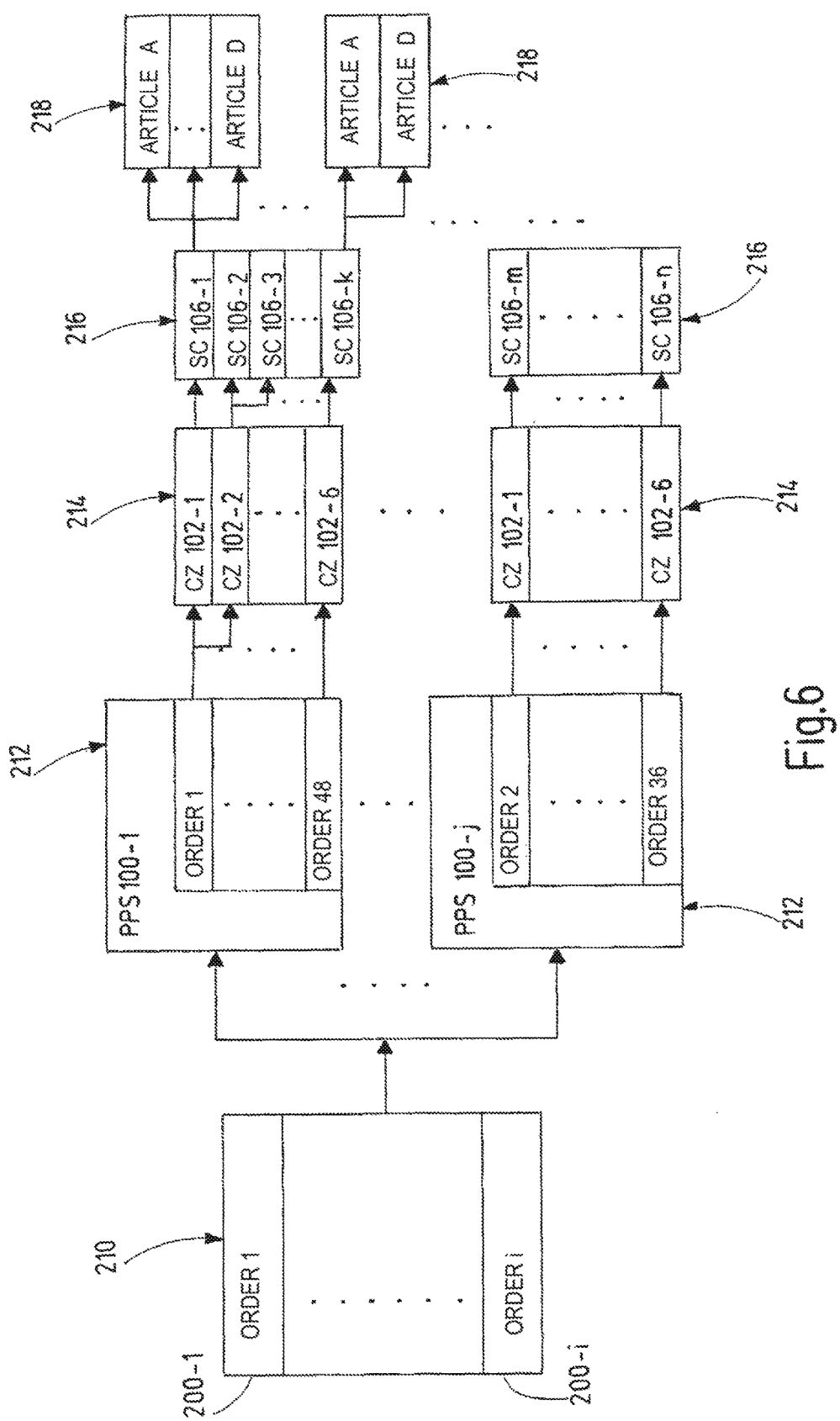
FIG. 6 shows a block diagram for illustrating assignments and divisions.

FIG. 6 shows the assignment and distribution of orders 200 to the picking-and-packing stations 100, collecting zones 102, and shipping containers 106. The block diagram of FIG. 6 will be explained from the left to the right.

The block 210 represents an entirety of collected orders 200-1 to 200-$i$, wherein i is an arbitrary integer. As will be explained later, the orders 200 are collected for being distributed subsequently to the picking-and-packing stations 100-1 to 100-$j$ which are indicated within the blocks 212. Each of the picking-and-packing stations 100 gets assigned at least one to-be-processed order 200 by the controlling unit 48. The assignment is performed by the controlling unit 48 as will be explained hereinafter in more detail. The "order 1" and "order 48" have been assigned, amongst other things, to the picking-and-packing station 100-1. The "order 2" and "order 36" have been assigned to the picking-and-packing station 100-$j$.

The blocks 214 show the assignment, or allocation, of the orders 200 to the collecting zones 102. For example, the collecting zones 102-1 and 102-2 are assigned to the "order 1" at the picking-and-packing station 100-1. The collecting zone 102-6 (only) has been assigned to the "order 48". At least one collecting zone 102 is assigned to each of the orders 200.

The blocks 216 represent the allocation between the collecting zones 102 and the shipping containers 106. For example, the shipping container 106-1 is assigned to the collecting zone 102-1. Both of the shipping containers 106-2 and 106-3 are assigned to the collecting zone 102-2. The shipping container 106-$k$ is assigned to the collecting zone 102-6. It is clear that at least one shipping container 106 is assigned to each of the collecting zones 102.

The block 218 represents order lines of the orders 200, which are to be packed into correspondingly assigned shipping containers 106. The shipping container 106-1 has been determined, for example, to receive, amongst other things, the articles A and D at a number of pieces not further indicated here. Also the shipping container 106-$k$ is determined for receiving the articles A and D. Here the batch-orientated processing and preparation of the orders 200 is clearly expressed. The articles A and D are processed at the picking-and-packing station 100-1 in a batch-orientated manner by distributing them in an order-orientated manner onto different collecting zones 102 as will explained in more detail below.

Figure 7:
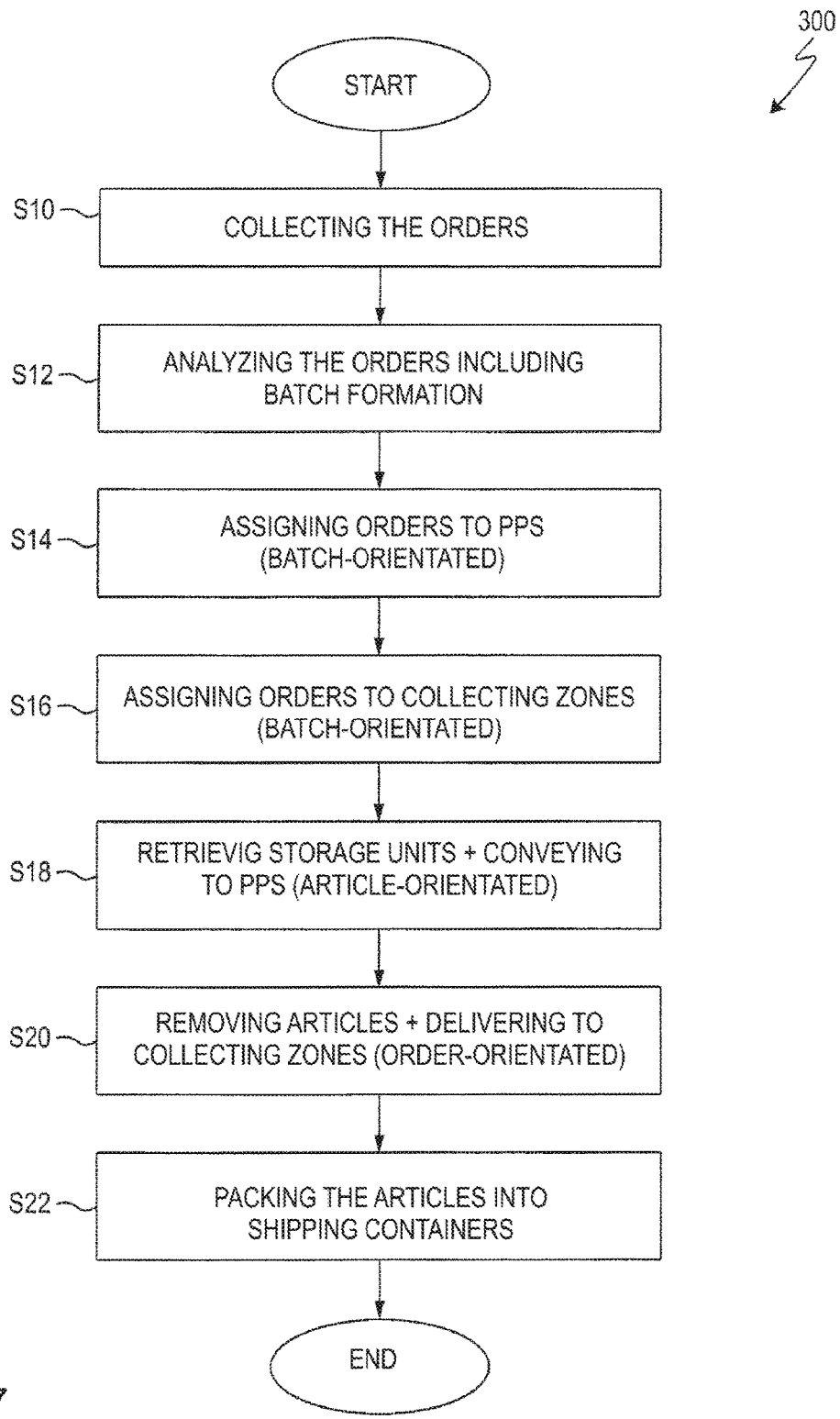
FIG. 7 shows a flow chart of a picking method of the invention.

With reference to FIG. 7 a flow chart 300 will be described hereinafter which represents a method for picking different articles in accordance with orders 200, wherein at least one of the orders 200 comprises both fragile articles 104 and non-fragile articles 104. It is the task of the packing person 110 to pack the articles 104 into the respective shipping container 106 such that the fragile articles 104 are secured against break by the non-fragile articles 104. The flow chart 300 of FIG. 7 shows the method of the present invention in a general manner. Specific aspects of the method will be described hereinafter with reference to FIGS. 8 to 10.

In a first step S10 of FIG. 7 the orders 200 are collected for being analyzed in a subsequent step S12. The analysis of the step S12 has the goal to assign the orders 200 in a batch-orientated manner to the PPS 100 or the collecting zones 102. In this context a spatial distribution of the PPS 100 within the picking region 40 can be taken into account. Also, a spatial distribution of the collecting zones 102 within one and the same PPS 100 can be taken into account. The orders 200 are distributed to the PPS 100, or the collecting zones 102 thereof, so that the storage units 90 are transported from the warehouse 26 in a path-optimized manner and/or picking-optimized manner through the system 10 via the conveying system 46. As soon as the analysis of step S12 is completed, the orders 200 are assigned to the PPS 100. This assignment is performed in step S14, also in a batch-orientated manner. As soon as the orders 200 are assigned to the PPS 100, the orders 200 can be assigned to the collecting zones 102 of the respective PPS 100. This happens in step S16. If the steps S12 to S16 are completed the distribution structure or assignment structure, of FIG. 6 is fixed.

In a subsequent step S18 of FIG. 7 the storage units 90, which preferably are containing articles of one type only, are retrieved from the warehouses 14, 18 and/or 26 and transported to the PPS 100 via the conveying system 46. The retrieval and the conveyance are performed in an article-orientated manner. As soon as the articles 104 arrive at the PPS 100 (cf. FIG. 4) the articles 104 are removed from the storage units 90, distributed to the respective collecting zones 102, and deposited into the corresponding collecting zone 102 (step S20). The removal, distribution, and deposition happen in an order-orientated manner. The removal, distribution, and deposition can be assisted by the picking-guidance system by activating, for example, the lamps 138 of the respective picking zones 102 into which the articles 104 of the respective storage unit 90 are to be deposited. The acknowledgement of the deposition can be performed optionally.

As soon as a sufficient quantity of articles 104 has been buffered in the respective collecting zone 102 the packing person 110 can pack the buffered articles 104 into shipping containers 106 which are provided and assigned. The packing process is preferably performed in a breakproof manner.

Figure 8:
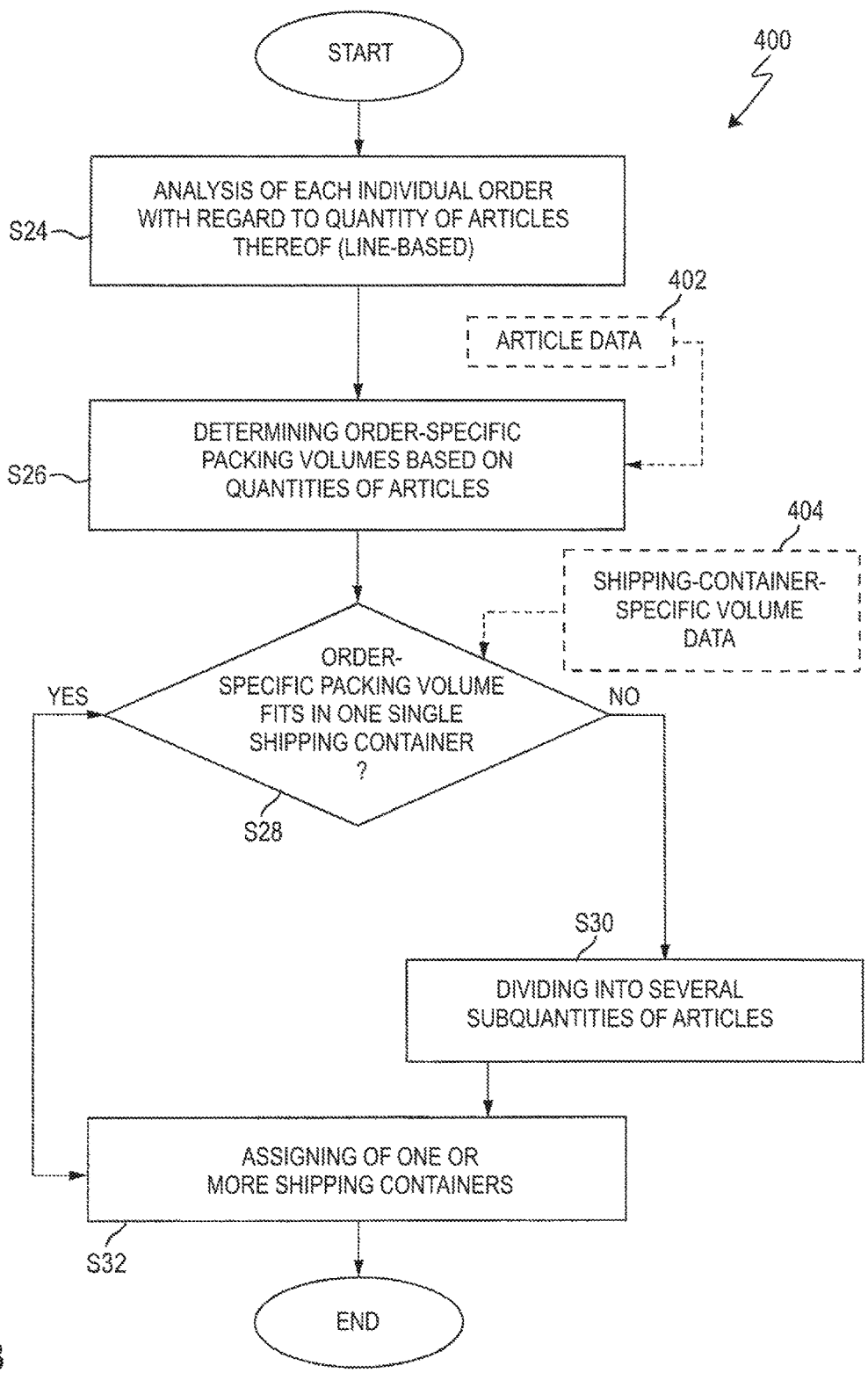
FIG. 8 shows a flow chart for explaining an analyzing step.

In FIG. 8 a flow chart 400 is shown which describes in more detail the analyzing step S12 of FIG. 7.

In a step S24 each individual order 200 can be analyzed with regard to its quantity of articles (order lines). The analysis preferably happens in a line-based manner wherein each of the order lines indicates a quantity of an article, which quantity contains articles of one type only, ordered by the customer. In this manner order-specific packing volume can be determined in common with the article data 402 in a step S26. The article data 402 can be recorded in a database, which is not shown in further detail here, in the controlling unit 48. Since shipping-container specific volume data 404 can also be recorded in this database it can be planned in advance which article 104 of an order 200 fits into which one of the order containers 106 with regard to quantity and/or volume. It is clear that differently sized shipping containers 106 can be provided for facilitating this optimization. The shipping containers 106 are to be packed, if possible, completely, and preferably without additional filling material, with fragile and non-fragile articles, in particular in a breakproof manner.

The corresponding planning algorithm, which is executed by the controlling unit 48, therefore can retrieve in a step S28 whether an order-specific packing volume fits into one single shipping container 106. If the quantity of articles does not fit into one single shipping container 106 the quantity of articles is partitioned into several subquantities of articles in a step S30. This partitioning in turn is performed based on a comparison of volumes (cf. also step S26). In each case the quantity of articles, or the subquantities of articles, get assigned one or more of the shipping containers 106 in a step S32.

Figure 9:
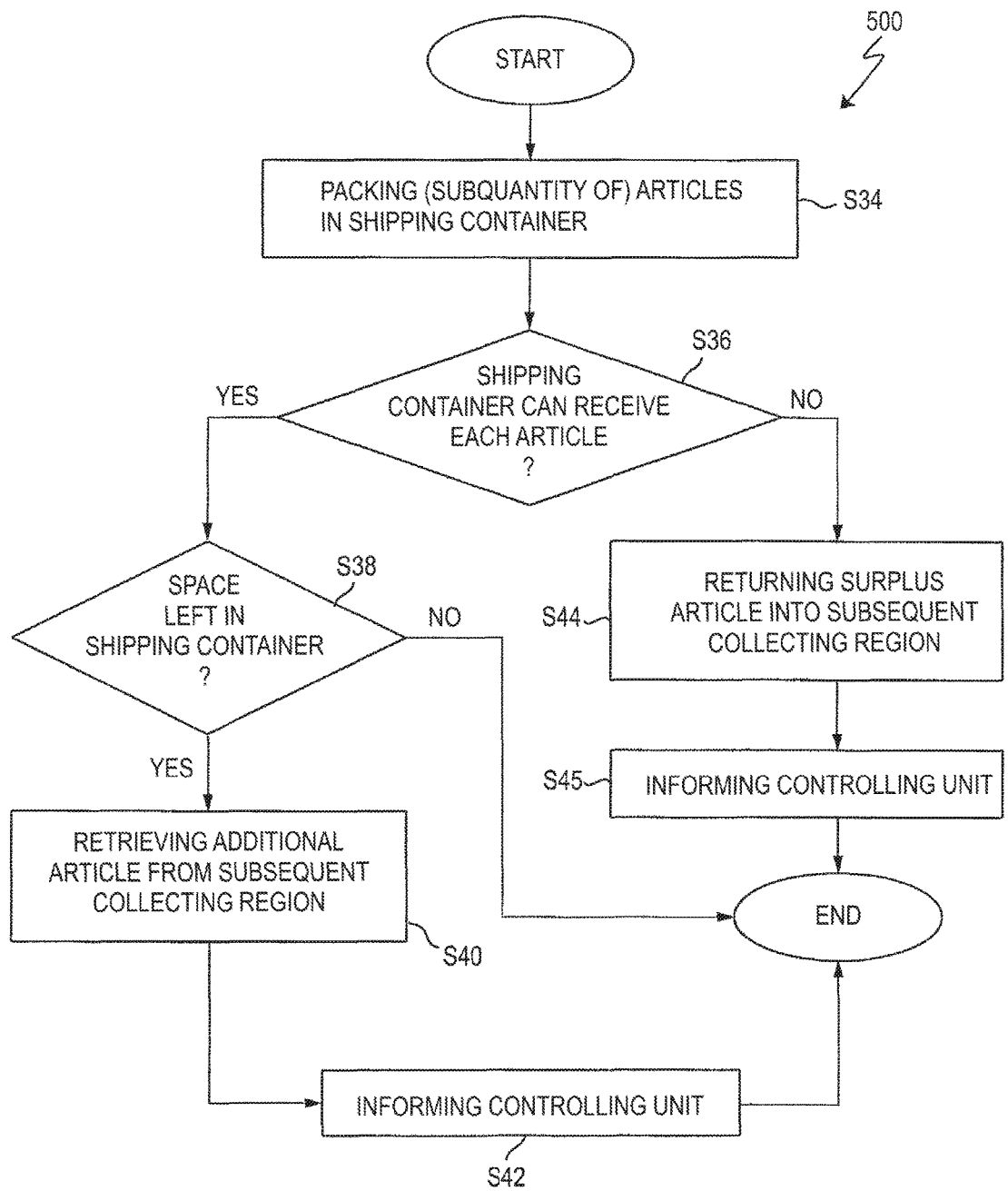
FIG. 9 shows a flow chart for explaining an article transfer between different shipping containers.

FIG. 9 shows a flow chart 500 explaining the method step S22 of FIG. 7 in more detail.

In a step S34 of FIG. 9 the articles, or the subquantities of articles, are packed into the corresponding shipping containers 106. If it turns out during the packing process (cf. step 36) that each of the articles 104 fits into the provided shipping container 106, then in step S38 it can be checked whether this shipping container 106 can still receive additional articles 104. If it can take no more articles 104 then the pre-planning was correct and the method ends. However, if there is still space left in this shipping container 106 additional articles 104, for example, from a subsequent collecting region can be removed and, contrary to the original planning, be packed into the shipping container 106 as well (cf. step S40). In this manner it is ensured that the shipping containers 106 are packed as densely as possible by the articles 104. Particularly, in this manner the breakproof packing is ensured. In this case the controlling unit 48 is informed in step S42 (e.g., by scanning) on which of the articles 104 and how many of the articles 104 of this type have been removed from the subsequent collecting region 146 and been given into the current order 200.

If it is determined in the inquiry of the step S36 that the shipping container 106 cannot receive each of the articles 104 which it is supposed to take in accordance with the planning in a step S44 the remaining articles 104 which could not be packed into this shipping container 106 can be put back into a subsequent collecting region 146. Of course, these articles can also be put into neighboring collecting zones 102. In this case, however, the packing person 110 informs the controlling unit 48 on this transfer of articles, for example, by reading the transferred articles 104 in advance by means of the scanning device 142. This happens in step S46.

Thus, the packing process 500 is relatively flexible with regard to deviations from the planned loading of the shipping container 106. In daily life it can always happen that the packing person 110 deviates from conventional packing habits which can generally not be compensated by the controlling unit 48 by in-advance calculation. Nevertheless the system 10 is sufficiently flexible to react to such deviations.

Figure 10:
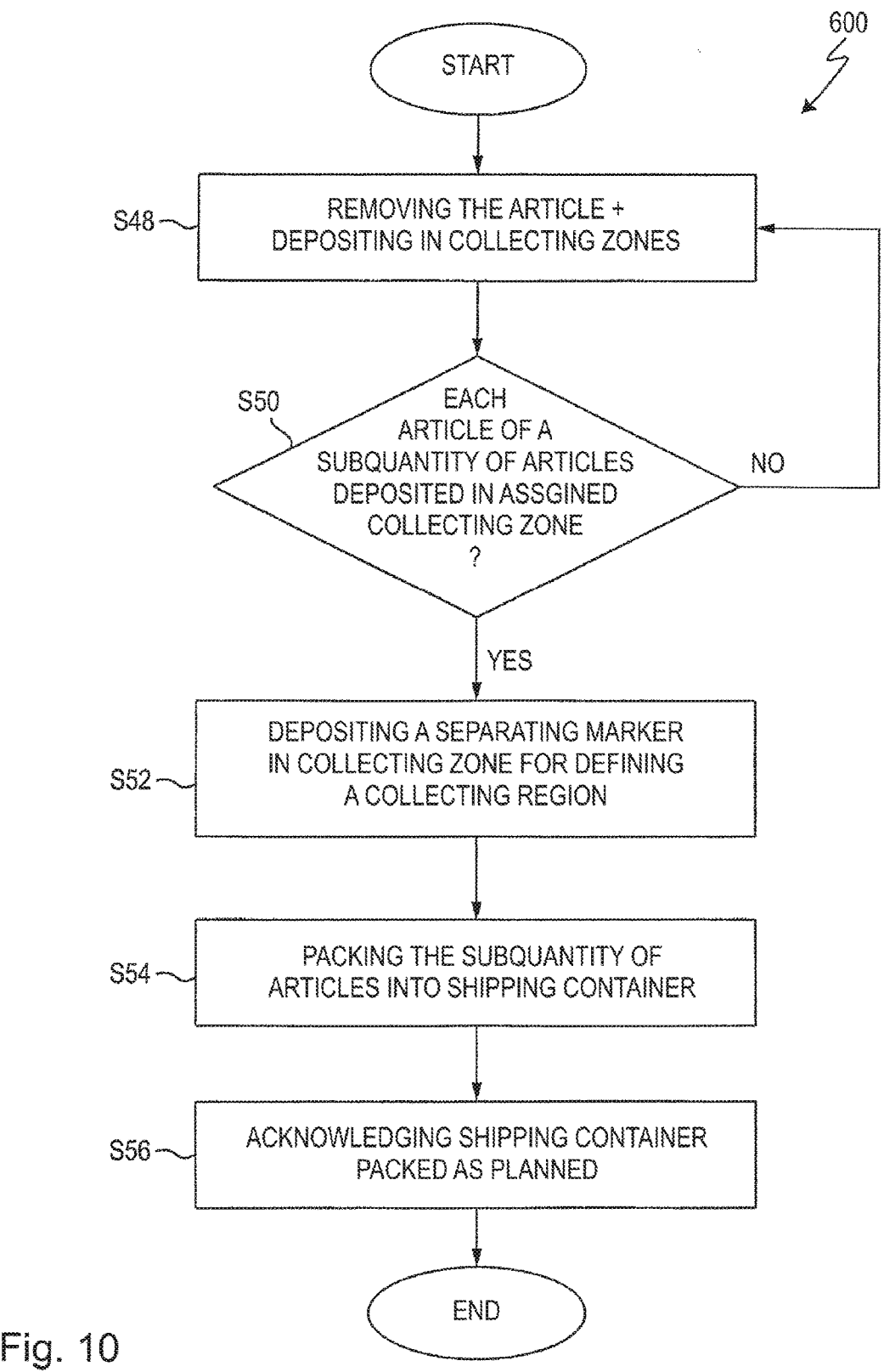
FIG. 10 shows a flow chart for explaining partitioning of an order onto several shipping containers including utilization of a separating marker.
Figure 11:
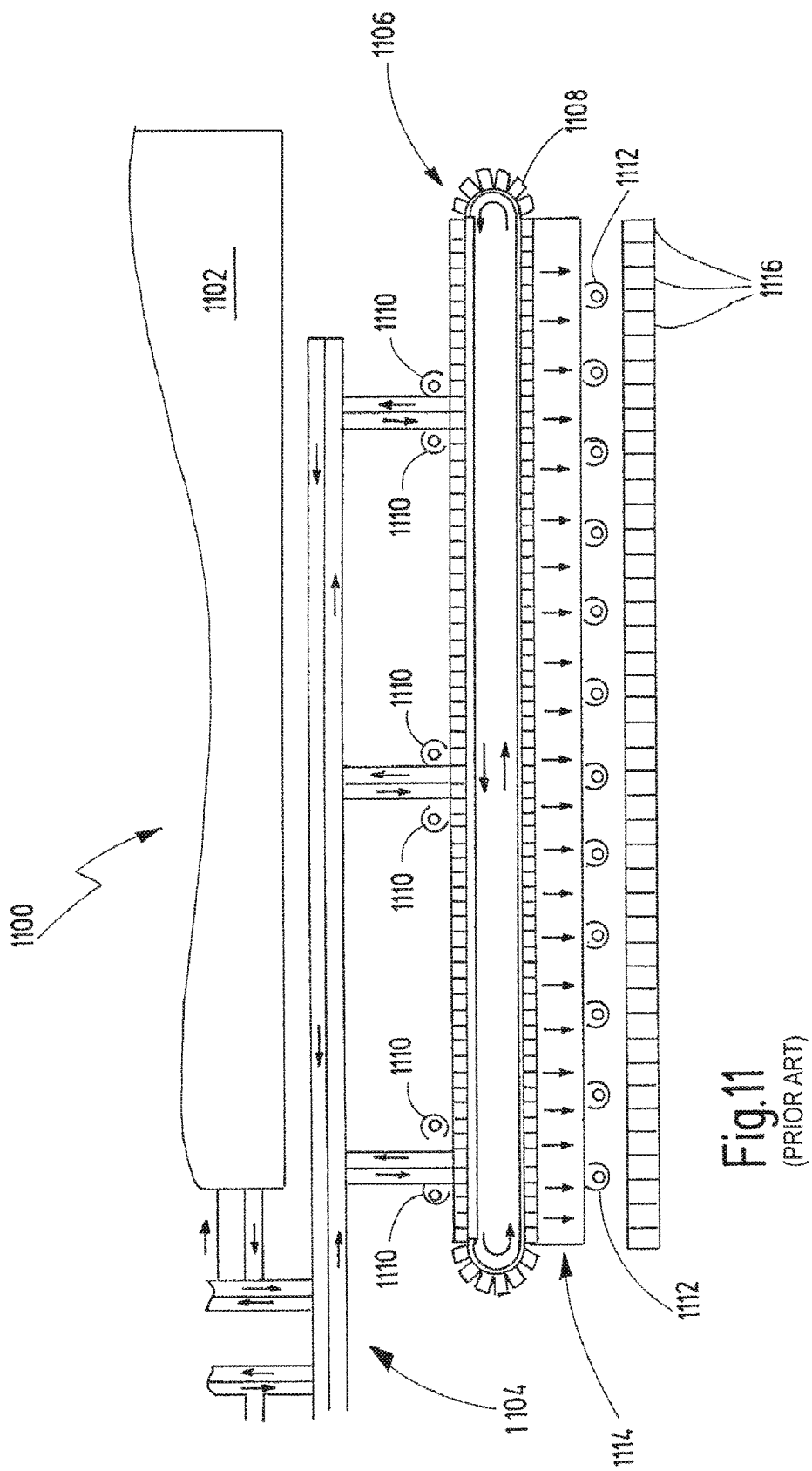
FIG. 11 shows a top view of a conventional order-picking system having a sorter.

FIG. 10 shows a flow chart 600 explaining the step S20 of the flow chart 300 of FIG. 7 in more detail in case when one order 200 is packed into a number of shipping containers 106, i.e. distributed to several collecting regions 146.

As always the articles 104 are removed at the PPS 110 in a first step S48 of FIG. 10, and deposited in an order-orientated manner in the corresponding collecting zones 102.

As soon as each of the articles 104 of a subquantity of articles has been deposited in the assigned collecting zone 102 (cf. inquiry S50) a separating marker 144 such as a plastic bar, a wooden strip, or the like can be deposited in the collecting zone 102 for defining collecting regions 146. Then the method begins again at step S48 for the new collecting region 146.

Subsequently, the articles 104 of the subquantity of articles are packed into the assigned shipping container 106 in step S54. As soon as of the shipping container 106 is completely packed the packing person 110 can acknowledge the end of the packing process to the controlling unit 48 (cf. step S56).

It is clear that the deposition of the separating marker 144 in the collecting zone 102 (cf. step S52) can be notified to the picking person 112 by the picking-guidance system.

Typically, the orders 200 are data sets. One order 200 can comprise a header, a priority field, and/or an article field. The header can comprise, amongst other things, information on the customer who has provided an order, on (customer) address, or on (customer) identification number as well as an order number. The priority field contains information on whether it is a normal order or an urgent order. An urgent order is an order which is handled at high (processings) priority, typically before normal orders, and can also be added to the analysis quantity at a later time. The article field comprises order lines. Each order line comprises at least information on a number of pieces of an ordered article and on an article type. The articles can be piece goods or cases.

Coordination of the processing of orders is done by an order-processing system which is integrated into the controlling unit 48 by means of hardware and/or software. The order processing can comprise an enterprise resource planning system. The controlling unit 48 further can have integrated a (warehouse) location administration as well as an information display. The controlling unit 48 is typically implemented by a data processing system operating preferably online for data transmission and data processing without delays.

Thus, a concept is described above which unifies the three steps of picking, packing, and palletizing. Specific advantages will be summarized below which are related to the individual steps in comparison to conventional picking systems:

Picking person 112 can pick from divided storage containers, but also from mixed containers (such as return goods).

Picking person 112 can also remove simultaneously, for example, ten articles 104, and subsequently distribute three, four, two, and one article 104, as displayed, to the collecting zones 102, wherein only one way is to be covered.

Picking person 112 does not need to put individual pieces one after the other as with, for example, the sorter solution. The deposition of the entire quantity is possible at once.

With a bundle pick the picking performance is higher (in this case the order lines and not the to-be-sorted pieces are relevant). The picking factor is increased.

Articles 104 do not need to be tracked as with, for example, the sorter. In the present case a direct physical allocation without intermediate media is performed (such as sorter trays, pick carts, pick-to-belt-systems, etc.).

Article 104 having oversizes or overweights, or difficult to handle articles 104 (e.g., rolling parts), can be picked without problems and distributed directly.

The number of collecting zones 102, arrangement thereof as well as size and constitution thereof can be designed, configured, and extended completely individually.

The picking person 112 can separate the orders respectively by one individual and freely moveable separating marker 144 (bar) in a visible, logical, and physical manner.

The articles 104 can be arranged in the collecting zones 102 on top of each other and next to each other (possibly already roughly pre-sorted for the subsequent packing person 110).

If a planned (packing) volume is reached (prematurally) the "target location" (collecting zone 102) does not need to be closed or separated in comparison to the sorter. In comparison to a picking-collection receptacle the order does not need to be aborted.

Each collecting zone 102 can simultaneously receive several orders individually. The picking person 112 puts the separating marker 144 according to system default in the respective collecting zone 102.

Prioritized orders can be notified immediately to the packing person 110 by the picking person 112 (or are visible to both). Displays and the like can be omitted.

In peak times (volume, fashion exchange, etc.) a plurality of collecting zones 102 can be concatenated to one single collecting zone 102 (broadening by removal of the barrier 116). During light-low operation (additional deliveries) only collecting zones 102 are addressed/used which are close to picking stations (path optimization).

Picking persons 112 and packing persons 110 form "one team" and can mutually change or assist ("job rotation").

The packing person 110 primarily packs from the, preferably flat, area for the purpose of damage-free provision of all kinds of articles 104.

Since the articles 104 are presented to the packing person 110 like in a window display, the packing person 110 can determine an individual and optimal packing sequence himself/herself. A packing-sequence generator is not required. Highest efficiency is achieved by packing optimization dependent on situation. Thus, no sequence needs to be delivered (heavy on bottom, light on top, etc.).

Voids within the shipping container 106 can be "stuffed" by the packing persons 110 and thereby the packing volume is significantly reduced resulting in a filling-degree optimization.

Packing person 110 does not need to be informed extra by display on completed orders. Due to the separating marker 144 an increased clarity for the picking person 112 and the packing person 110 exists.

Storage cartons, which became empty, can be forwarded directly by the picking person 112 to the packing person 110 for utilization as shipping containers 106.

The packing person 110 does not need to pack, such as with the conventional sorter solution, a closed target location, or order, for releasing the target location (generation of several sorting-device circulations) but only if the table 137 overflows.

The packing person 110 (and the picking person 112 as well) has an overview on each of the collecting zones 102 (from each location) and decides himself/herself where to work.

Full cases, uglys, and oversized articles 104 can be put directly (without picking process) by the packing persons 110 onto the order pallet 108 behind him/her, and can be palletized.

All the employees have a free view over the entire system (good atmosphere and ergonomics) no sight barriers by the sorter.

Arrangement, which can be arbitrarily compact, and clarity of the work islands 42. No boundaries of the arrangement according to necessary sorter course/routing (bending radius and direction changes are limited). If AGV are used the islands can be distributed arbitrarily in the facility (also within the planes).

Limitation of conventional sorter-target locations (dependent on maximum sorter length) and performance is not given but almost arbitrarily extendible and designable.

Conventional sorters are selected for specific applications (tilt tray, transversal-belt sorter, comb sorter, sliding shoe sorter, rotating arm sorter, push sorter, pop-up sorter, roulette switch sorter, pivotal sorter, channel sorter, etc.) and thus are always delimited to the sorting range and the performance, wherein individual pieces, however, are always sorted (in a distributed manner). The invention is independent thereof.

Article labelling: With the invention the individual article barcode can be omitted. Individual pieces are not read. The allocation happens directly from the provision carton to the collecting zone 102. Tracking of articles 104 can be omitted (reduction of errors by less system handlings).

In the present case a one-stop strategy is applied. Consolidation is not required. The picking, packing, and palletizing can happen at one single location for each of the articles 104.

In the description of the figures like units, components, features have been designated by the like reference numerals. Modified objects have been designated by modified reference numerals. The figures have been designated in accordance with designations typically used in the field of (intra) logistics so that the longitudinal direction is designated by X, the transversal direction is designated by Z, and the (vertical) height is designated by Y. Position and orientation information (such as "above", "below", "lateral", "longitudinal", "transversal", "horizontal", "vertical" or the like) refer to the immediately described figure. If the position or orientation is changed the information is to be transferred roughly, however, to the new position and orientation.

LIST OF REFERENCE NUMERALS

10 Storage and order-picking system
12 Goods receipt (WE)
14 (Long-term) warehouse
16 High-bay warehouse
18 Block warehouse
20 Separating station
22 Depalletizing device
24 Pallets
26 (Short-term) warehouse
28 Picking warehouse
30 Distributing system
40 Picking region
42 Work-station island (WS island)
44 Goods issue/shipping region
46 Conveying system
48 Controlling unit
50 Pre-zone
52 Conveyor
54 Racks
56 Aisles
58 Storage and retrieval devices (SRD)
60 Stacker truck
62 Pallet-provision location
64 Gravity track
H Height level
70 Pallet-conveying system
72 Platform
74 Tray-conveying system
76 Loaded pallet
78 Empty pallet
80 Stack of empty pallets
82 Conveying direction
84 Shaft
86 Tray
88 Stack of trays
90 Storage unit
92 Destacker device
94 Employee
100 Picking-and-packing station (PPS)
102 Collecting zone
104 Article
106 Shipping container
108 Order pallet
110 Packing person
12 Picking person
113 Display
114 Transferring device
118 Oversized article
116 Barrier
120 Lift truck
122 Feeding line
124 Discharging line
130 Aisle
132 First side of 100
134 Second side of 100
136 Put-to-light system/picking-guidance system
137 Table
138 Lamps
140 Buttons
142 Scanning device
144 Separating marker
146 Collecting region
148 Feeding device for 106
150 Provision type for 108
200 Order
210 Block
212 Block
214 Block
216 Block
218 Block
300 Order-picking method
400 Analyzing method
402 Article data (volume)
404 Volume data
1100 Order-picking system
1102 Order-picking warehouse
1104 Conveying system
1106 Sorter
1108 Sorter tray 1110 Employee
1111 Employee
1112 Employee
1114 Target-location region
1116 Order pallets Therefore what we claim is:

1. A method for picking, according to the goods-to-man principle, a plurality of different articles in accordance with orders, wherein at least one of the orders has both fragile and non-fragile articles, which are packed together into one shipping container in a breakproof manner, in a storage and order-picking system, wherein the storage and order-picking system includes: a warehouse in which at least some of the articles are stored in terms of storage units, each of the storage units containing only one article type of fragile or non-fragile articles; at least one picking-and-packing station comprising a plurality of stationary collecting zones being configured to buffer a plurality of the articles and being configured to provide one or more shipping containers; a conveying system connecting the warehouse to the at least one picking-and-packing station; and a controlling unit configured to assign the at least one of the orders to the at least one picking-and-packing station, to monitor the picking, and to control article flow, wherein the method comprises the steps of:
collecting a plurality of the orders which includes the at least one of the orders having both the fragile and the non-fragile articles;
batch-orientated analyzing the collected orders by the controlling unit;
batch-orientated assigning the analyzed orders to the at least one picking-and-packing station by the controlling unit, wherein each of the analyzed orders is assigned to at least one collecting zone among the plurality of stationary collecting zones;
article-orientated conveying the storage units via the conveying system from the warehouse to the at least one picking-and-packing station, wherein each of the storage units contains only the one article type of fragile articles or non-fragile articles;
removing both the fragile and the non-fragile articles from the respective storage units conveyed to the at least one picking-and-packing station, and order-orientated distributing the removed fragile and non-fragile articles to corresponding collecting zones among the plurality of stationary collecting zones by depositing the removed fragile and non-fragile articles into the corresponding collecting zones; and
manually packing the deposited fragile and non-fragile articles together, in a breakproof manner into the one or more shipping containers at the at least one picking-and-packing station.

2. The method of claim 1, wherein the step of batch-orientated assigning the analyzed orders to the at least one picking-and-packing station by the controlling unit includes assigning each of the analyzed orders to a different one of the collecting zones.

3. The method of claim 1, wherein each of the orders comprises at least one order line, and wherein the step of removing is performed in a bundled manner for each of the order lines which includes several articles of an identical article type.

4. The method of claim 1, wherein the step of packing is performed such that the fragile articles of the at least one of the orders are secured by the non-fragile articles of the at least one of the orders against destruction during subsequent transportation.

5. The method of claim 1 further comprising the step of:
collecting sufficient quantities of the removed articles in the collecting zones in order to allow at least one of breakproof packing and filling-degree optimized packing.

6. The method of claim 1, wherein the step of packing is performed without additional filling material.

7. The method of claim 1 further comprising the step of:
order-orientated stacking shipping containers, which are completely packed, on order-load supports.

8. The method of claim 1, wherein the step of analyzing comprises:
analyzing each of the orders with regard to a respective order-specific quantity of articles;
determining an order-specific packing volume on the basis of the respective order-specific quantity of articles;
dividing the respective order-specific quantity of articles into one or more subquantities of articles; and
assigning each of the subquantities of articles to a corresponding shipping container.

9. The method of claim 8, wherein the step of dividing the respective order-specific quantity of articles into one or more subquantities of articles is performed dependent on a quotient of the order-specific packing volume and a volume of one shipping container.

10. The method of claim 9, further comprising the following step, if the order-specific quantity of articles is divided and assigned to several ones of the shipping containers:
respectively placing a separating marker into the collecting zone after the articles of one of the subquantities of articles are deposited in the collecting zone, in order to define respective collecting regions.

11. The method of claim 10 wherein the step of packing includes:
packing the articles from one of the collecting regions into the assigned shipping container;
checking whether the assigned shipping container can receive each of the articles from the one of the collecting regions;
depositing surplus articles from the one of the collection regions in a subsequent one of the collecting regions, and informing the controlling unit on the deposited surplus articles, if the assigned shipping container cannot receive each of the articles from the one of the collecting regions; or
if the assigned shipping container can receive more than the articles from the one of the collecting regions, removing additional articles from a subsequent one of the collecting regions, packing the additional articles into the assigned shipping container until the assigned shipping container is completely packed, and informing the controlling unit on the removal of the additional articles.

12. A storage and order-picking system having at least one picking-and-packing station for picking, in accordance with the goods-to-man principle, a plurality of different articles in accordance with orders, wherein at least one of the orders has both fragile articles and non-fragile articles, which at least one picking-and-packing station comprises:
a plurality of stationary collecting zones, wherein each of the collecting zones is configured to be loaded from a first side for buffering both the fragile and the non-fragile articles, and is configured to be unloaded from a second opposite side for manually packing both the fragile and the non-fragile articles in the at least one shipping container in a breakproof manner;

a feeding device for providing empty shipping containers at the plurality of stationary collecting zones;

a provision location for order-load supports;

a feeding device for providing storage units to the plurality of stationary collecting zones, the storage units containing the fragile and the non-fragile articles to be buffered at the collecting zones;

a discharging device for removing the storage units from the collecting zones; and a picking-guidance system;

wherein the storage an order-picking system further comprises:

a warehouse where the storage units, each of which contains only one article type of fragile or non-fragile articles are stored;

a conveying system; and a controlling unit configured to perform the steps of:
batch-orientated analyzing the orders; and
batch-orientated assigning the analyzed orders to the picking-and-packing station, wherein each of the analyzed orders is assigned to at least one collecting zone among the plurality of stationary collecting zones.

13. The storage an order-picking system of claim 12, wherein the conveying system comprises at least one of a pallet-conveying system and a tray-conveying system.

14. The storage and order-picking system of claim 12 further comprising at least one of the following components: a goods receipt, a long-term warehouse, a high-bay warehouse, a block warehouse, a separating station, a depalletizing device, a short-term warehouse, a distributing system, a picking region, a stacker truck, a rack, a gravity track, and a goods issue.

15. The storage and order-picking system of claim 12, wherein the collecting zones of the picking-and-packing station are arranged side-by-side, and are physically separated from each other by barriers.

16. The storage and order-picking system of claim 12, wherein the controlling unit is configured to perform the further steps of:

analyzing each of the orders with regard to a respective order-specific quantity of articles;

determining an order-specific packing volume on the basis of the respective order-specific quantity of articles;

dividing the respective order-specific quantity of articles into one or more subquantities of articles dependent on a quotient of the order-specific packing volume and a volume of one shipping container; and assigning each of the subquantities of articles to a corresponding shipping container.

17. A storage and order-picking system having at least one picking-and-packing station comprising: a plurality of collecting zones, wherein each of the collecting zones is configured to be loaded from a first side for buffering the articles and to be unloaded from a second opposite side for packing the at least one shipping container; a feeding device for providing empty shipping containers at the collecting zones; a provision location for order-load supports; a feeding device for providing storage units containing the to-be-picked articles at the collecting zone; a discharging device for removing the storage units from the collecting zones; and a picking-guidance system:

wherein the storage and order-picking system further comprises:

a warehouse where storage units, each of which contains articles of one article type only, are stored;

a conveying system; and a controlling unit configured to perform the steps of:
batch-orientated analyzing the orders; and
batch-orientated assigning the analyzed orders to the picking-and-packing station, wherein each of the analyze orders is assigned to the collecting zones;

wherein the controlling unit is configured to preform the further steps of:

analyzing each of the orders with regard to a respective order-specific quantity of articles;

determining an order-specific packing volume on the basis of the respective order-specific quantity of articles;

dividing the respective order-specific quantity of articles into one or more subquantities of articles dependent on a quotient of the order-specific packing volume and a volume of one shipping container; and assigning each of the subquantities of articles to a corresponding shipping container; and wherein the storage an order-picking system further comprises separating markers which are respectively placed into a corresponding collecting zone among the plurality of collecting zones after the articles of one of the subquantities of articles are deposited in the corresponding collecting zone in order to define respective collecting regions, if the order-specific quantity of articles is divided and assigned to several ones of the shipping containers.

* * * * *